US 7,414,981 B2

(12) United States Patent
Jaramillo et al.

(10) Patent No.: US 7,414,981 B2
(45) Date of Patent: Aug. 19, 2008

(54) METHOD AND SYSTEM FOR EVENT AND MESSAGE REGISTRATION BY AN ASSOCIATION CONTROLLER

(75) Inventors: Paul Daniel Jaramillo, Westminster, CO (US); Jafar S. Nabkel, Boulder, CO (US); Ronald J. Egan, Aurora, CO (US)

(73) Assignee: Qwest Communications International, Inc., Denver, CO (US)

( * ) Notice: Subject to any disclaimer, the term of this patent is extended or adjusted under 35 U.S.C. 154(b) by 1443 days.

(21) Appl. No.: 10/085,424

(22) Filed: Feb. 28, 2002

(65) Prior Publication Data

US 2002/0196741 A1 Dec. 26, 2002

Related U.S. Application Data

(63) Continuation-in-part of application No. 09/842,986, filed on Apr. 25, 2001, now Pat. No. 6,674,725.

(51) Int. Cl.
*H04L 12/26* (2006.01)
(52) U.S. Cl. ........................................ 370/252; 370/465
(58) Field of Classification Search ........................ None
See application file for complete search history.

(56) References Cited

U.S. PATENT DOCUMENTS

| | | | | |
|---|---|---|---|---|
| 5,592,533 A * | 1/1997 | McHenry et al. | ......... | 455/435.2 |
| 5,610,972 A * | 3/1997 | Emery et al. | ................. | 455/445 |
| 5,721,825 A * | 2/1998 | Lawson et al. | ............... | 709/203 |
| 5,963,626 A | 10/1999 | Nabkel | ........................ | 379/142 |
| 5,999,613 A | 12/1999 | Nabkel et al. | ................ | 379/215 |
| 6,009,163 A | 12/1999 | Nabkel et al. | ................ | 379/266 |
| 6,011,845 A | 1/2000 | Nabkel et al. | ................ | 379/266 |
| 6,049,600 A | 4/2000 | Nabkel et al. | ................ | 379/201 |
| 6,104,797 A | 8/2000 | Nabkel et al. | ................ | 379/201 |
| 6,141,328 A | 10/2000 | Nabkel et al. | ................ | 370/259 |
| 6,178,231 B1 | 1/2001 | Nabkel | ..................... | 379/88.19 |
| 7,039,164 B1 * | 5/2006 | Howe | ...................... | 379/88.05 |
| 7,050,558 B1 * | 5/2006 | Pershan et al. | ......... | 379/211.02 |

* cited by examiner

*Primary Examiner*—Huy D. Vu
*Assistant Examiner*—Rhonda Murphy
(74) *Attorney, Agent, or Firm*—Robert G. Crouch; Marsh Fischmann & Breyfogle LLP

(57) ABSTRACT

A system and method is provided for higher-level service intelligence to cooperatively interoperate via a common session control and uniformly control and coordinate at least one transport resource provided by a communication network service provider. Including in the system is at least one association controller (AC) which is connectable to one or more communications networks so as to communicate with a systems entity located therein. In particular, the AC is configured to dynamically receive event registration list (ERL) which include a listing of events, wherein the list is received through an interactive exchange with an integrated services controller (ISC) associated with the particular AC. Receipt of the list registers one or more events for communications services which have a notification interest in the particular event.

55 Claims, 12 Drawing Sheets

MMSP – Example Merged Multi-Service Service Profile:

| | MASTER Key Fields | | | Presence Service | | Availability Service | Selective Call Forwarding Service | | Priority Call Waiting Service | | Do Not Disturb Service | | Instant Messaging Service | No Solicitation Service | Other Service XYZ |
|---|---|---|---|---|---|---|---|---|---|---|---|---|---|---|---|
| | | Device User Name | Device System ID | Device Location | Device State | | Service Parameter 1 | Service Parameter 2 | Service Parameter 1 | Service Parameter 2 | Service Parameter 1 | | Service Parameter 1 | Service Parameter 1 | Service Parameter 1 |
| Visibility to Other Services | | | ??? | Visible | | | | | | | | | | | |
| Global Service ID | | | | | LREFXB3975ZT | | | | | | | | | | |
| | | Kitchen Phone | XK87RW92K1 | Home | ON | | | | | | | | | | |
| | | Bedroom Phone | XK87RT35B2 | Home | OFF | | | | | | | | | | |
| | | Den Phone | XK87RP80D1 | Home | ON | | | | | | | | | | |
| | | Mobile Phone 1 | XK87RB31M1 | Office | ON | | | | | | | | | | |
| | | Mobile Phone 2 | XK87RG46M2 | Travel | OFF | | | | | | | | | | |
| | Personal Phone Number (Home / Mobile) | Alternate Phone Number (Mobile, Pager, ...) | E-Mail Address | Internet (IP) Address | Business Phone Number | Visibility of Who Can See Me | Activated | Forwarding Phone Number | Activated | Calls with Individual are Interruptible | Interrupt Other Calls | Available | Conditional Hours | Available | Activated | Other Parameters Activated |
| Default for ALL Individuals | Read-Only + ADD | Edit | Read-Only + ADD | Read-Only + ADD | Edit | NO | OFF | – | ON | ALL | ALL | Available | | NO | | |
| Modifiability by Child ISC | | | | | | YES | L | Lock | Edit | Lock | Lock | Edit | OFF 6:00p-8:00p + 11:00p-7:00a | Edit | Y Locked | |
| Jennifer Smith | 532-690-5910 | 532-894-1230 | jsmith@unive rse.net | 943.32.05.032 | 532-742-8234 | | | | | Y | NO | | | Edit | | |
| Konor Baguandu | 723-940-7393 | 723-672-0049 | Konor@qwes t.net | 732.00.32.532 | | | | | | NO | Y | ON | | Y | | |
| Cheryl Vermille | 493-883-6219 | 948-405-1120 | Cvermi@gala ctic.com | 211.43.88.534 | 948-233-8429 | | ON | 303-747-8209 | | Y | Y | | | | | |
| Christopher Johnson | 303-494-3290 | 303-023-1029 | Chris.johnson @qwest.net | 131.77.35.957 | 303-541-7070 | YES | | | ON | Y | N | ON | | Y | | |
| Bilutu Mashita | 297-403-0492 | 297-593-9340 | Bilutu.mashit a@qwest.net | 683.11.55.433 | | | | | | NO | Y | ON | | Y | | |

Fig. 5

METHOD AND SYSTEM FOR EVENT AND MESSAGE REGISTRATION BY AN ASSOCIATION CONTROLLER

RELATED APPLICATIONS

This application is a Continuation-in-Part of U.S. patent application Ser. No. 09/842,986 filed Apr. 25, 2001, now U.S. Pat. No. 6,674,725.

FIELD OF THE INVENTION

The invention described herein relates to an integrated control system for a plurality of communications services, and more particularly to a control system and method for intelligent, distributed, and dynamically integrated control of multiple communication services, possibly across multiple domains and possibly from a multiple communication services providers.

BACKGROUND OF THE INVENTION

In the world of telecommunications, a party has a number of choices with regards to types of communication. These different types may include such services as synchronous communications, such as voice telephony, over networks such as the Public Switched Telephone Network (PSTN) or asynchronous communications, such as Instant Messaging, over networks such as the Internet. Emerging technologies, such as Voice over Internet Protocol (VoIP) carry telephony over packet networks and present new types of communication service. A party may engage any number of communications service providers in order to employ these types of communications.

In employing the various communication services, via multiple service providers, existing communication networks, such as the PSTN and the Wireless/PCS (Personal Communication Service) Network, either provide very limited service control capabilities, or none at all. Traditional SSP (Service Switching Points) switches and AIN (Advanced Intelligent Network) SCPs (Service Control Points) do indeed have limited static service control with built-in simple management of multiple services. Typically called "feature management," (i.e., one aspect of service control) the logic that governs service prioritization, however, is statically defined and often even built into the processing system environment on the SSP or SCP. Neither support dynamic insertion (i.e., installation and activation) of new services—much less from multiple providers across multiple domains—that is, services that were conceived and built after the service control logic was deployed. As such, plug 'n' play of new services with intelligent service inter-working may not be possible.

Similarly, existing data and multimedia communications systems, such as the Internet-based networks or specific consumer video delivery systems, provide a predominantly single-application-to-single-service capability. Historically this relationship was very rigid, for example, an email application provided a capability to exchange email—an email service; a file transfer application provided the capability to exchange files—a file transfer service; and a web browser provided the capability to access web-page servers.

Currently, there is a trend to bundle multiple service capabilities into single ("multiservice") applications (e.g., Microsoft Internet Explorer with Web Browser, Email and Net-News capabilities, or Netscape Navigator with similar capabilities, including Instant Messaging), however, these applications only integrate the user interface to multiple, disparate services with minor levels of integration between the individual services, e.g., a shared address book or web access direct from links contained in email messages. Also, these applications still exhibit the same restrictions as the PSTN, that is, there is limited, if any, capability to dynamically insert new services. In addition, most of the "service integration" is performed by software in the customer equipment/network, or in individual application servers, and not in the service provider network.

Finally, there is only very limited service interaction between traditional PSTN and current data/multimedia or other telecommunications environments, e.g., Wireless/PCS. Examples of these interactions would be services such as "Internet Call Waiting", "TV Caller ID", "Wireless Extension", "Click-to-Dial" web pages and emerging Internet Telephony to PSTN Gateway capabilities. Again, the ability to support dynamic insertion of new services in this combined environment is non-existent.

Similarly, existing feature management systems do not provide a method and system to integrate, or dynamically merge, profile information from multiple services, and or multiple providers. This includes everything from service configuration parameters and customer preferences to more complex lists with associated actions. For example, most people today use multiple devices (and services) that each have their own "directory" of other people (e.g. address/phone book, screening list, hot-dial list, e-mail list, . . . ) where each entry might have one or more parameters or actions associated with it. The lack of an inter-service schema and method to merge these disparate profiles causes end-users to re-enter the same data for each service. In addition, each service presents a different user interface limited to the profile information it cares about, rather than an integrated interface across services and service providers.

Today, enhanced services augment basic call control through a predefined (static) set of events and messages. The Advanced Intelligent Network (AIN) capability of the PSTN is an example of this wherein predefined triggers (events) generate predefined messages that are replayed to an adjunct processor (the SCP) to determine what action should occur. In turn, the static (compiled) feature manager in the SCP is only able to filter the predefined set of messages and based on its hard-coded logic initiate a specific service. It is not able to process events or messages defined by new services or new transport control capabilities. Therefore, service control is static, limited, and not extensible.

Further limitations of today's feature managers exist in their proprietary service creation and execution environments. It is not easy, and in some cases not possible, to deploy services created by multiple service providers in a single service creation-execution environment. In addition, it is not possible to deploy those services across different domains—for example, one within an ILEC (Incumbant Local Exchange Carrier) local network, another within a inter-exchange carrier network.

And finally, existing feature managers don't work in a distinct functional layer of service control with open interoperable interfaces between the feature manager and individual services, or between the feature manager and transport control (of transport, switching, routing, and transmission).

Beyond traditional SSPs and SCPs few other systems provide any kind of service control, including IP (Internet Protocol) application servers. Some emerging technologies may offer more in the way of static service registration and control, but these are based on predefined prioritization and processing rules. Given the static, limited, and closed capabilities of feature managers today, there exists a need to provide dynamic service integration and management.

As we look to the future, a multi-technology-infrastructure environment, consisting of legacy PSTN-AIN, Wireless/PCS Voice and Data, Voice over Asynchronous Transfer Mode (VoATM), Voice over Internet Protocol (VoIP), Gigabit Ethernet access, Consumer Video and a full set of Internet-based data and multimedia services will exist. This combined environment will be much more valuable with convergence toward an integrated multi-service environment providing dynamic service integration and management. In order to provide this guidance, an open and systematic architecture that integrates services with powerful services control functionality, capable of addressing these limitations and constraints is required.

SUMMARY OF THE INVENTION

Described herein is a system and method for providing higher-level service intelligence to cooperatively interoperate via a common session control and uniformly control and coordinate at least one transport resource provided by a communication network service provider. Including in the system is at least one association controller (AC) which is connectable to one or more communications network so as to communicate with a systems entity located therein. In particular, the AC is configured to dynamically receive event registration list (ERL) which include a listing of events, wherein the list is received through an interactive exchange with an integrated services controller (ISC) associated with the particular AC. Receipt of the list registers one or more events for communications services which have a notification interest in the particular event.

With regards to the system described herein the plurality of system entities may include another AC, and association state manager (ASM) a message broker (MB) and ISC, and one or more of the service logic entity.

The AC may be further configured to dynamically receive a corresponding message registration list (MFTL) through an interactive exchange with the ISC, where messages described in the MRL relate to handling of the events which the system entity has a notification interest in. The messages may include message primitives and related message payload information elements which may further comprise requested event context criteria. The message primitives may comprise such things as informational, request and instructional action types each of which is depended on a purpose associated with handling a particular event. The purposes may include things as control, coordination and negotiation with other system entities. Context criteria may include such things as identification of system entities, system entity state information event attributes and events attribute values.

In one configuration of the invention the ISC is configured to dynamically receive an ERL through interactive exchange with all of the system entities in the system network which has a notification interest in a particular invent included in the ERL. The ISC also may be configured to dynamically receive MRL through an interactive exchange with one or more systems entities. The at least one message may include related message payload information.

The system may be further configured such that the AC is further operative to provide auto-discovery of the discrete event notification that can be delivered to the ISC on behalf of a service logic entity. The AC may further be configured to dynamically modify the ERL through negotiation of the registration of the events of the ERL with the ISC on behalf of the particular service logic entity.

The AC may be further configured to provide message dispatching to facilitate sending and receiving messages to system entities in order to coordinate communication transport association control. As part of this message dispatching, the AC is operative to provide auto discovery of messages that can be delivered to an ISC on behalf of a particular service logic entity. The AC may dynamically modify the MRL through negotiations of the administration of the messages with the ISC on behalf of the service logic entity.

The AC may be further configured to provide for sending and receiving of the messages through use of system entity naming identification for a system entity for one or more events and messages which are to be received by a particular service logic entity. The AC may also provide for the dynamic configuration of message profiles, comprised of definitions of message primitives and event context criteria which support the interoperability of message exchange with the system entity.

The AC may further be configured to provide for the configuration, control and coordination of one or more of the ASM's, where the configuration of the ASM may comprise initialization by transferring the ERL configuration from a related AC. The ASM may then apply all or part of the ERL relative to the communication association state criteria the particular ASM manages.

The ASM may be further configured to provide auto-discovery of messages that can be delivered to the AC on behalf of a particular service entity. The ASM may dynamically modify the MRL through negotiations of registration of the messages with the AC on behalf of the particular service logic entity. The coordination the AC for the ASM comprise high level monitoring, event validation and coordination of the modification, augmentation and releasing of communication association requests on behalf of a particular service logic entity. The establishment of a ASM by a AC may be based on state criteria requirements and transferring of the MRL registration, state initialization, parameter initialization, deconstruction, and high level state management for the ASM.

The ASM may embody a state model that manages communications association state criteria and is operative to process receive notifications of events and generate messages as a result of internal events that are sent to the system entity. The ASM may provide the mapping of messages received or transport level events corresponding to a transport entity and at least one registered event detection state for said state model. The transport entity may include an access porthole (AP), a transport channel access bridge (TCAB), and transport channel (TC).

The state model for the ASM may comprise: a logical state representing a point in a communication association session processing and associated event detection points where associated detection points may comprise authorization, information collection, establishment, mid-association modification and releasing of a communication association. The ASM state model may also provide concurrence representation of an originating, terminating, or intermediate point of a communication association.

In yet another configuration of the invention, the AC may be configured as a child member within a group all related to a parent AC that manages a transport level resource group of related individual transport resources or a group of related TAC groups. As part of this configuration, the parent AC may be configured to relay ERL's and MRL's to each child member AC within a group managed by a parent AC. A child member AC may be further configured to facilitate the sending and receiving of messages to a higher order hierarchically related AC, wherein the parent AC provides for coordination and aggregation of the messages and related message payload information elements for a particular system entity. The AC may further provide for dynamic configuration of policies that govern the AC's hierarchal relationship with other related AC's and other related ASM's.

BRIEF DESCRIPTION OF THE DRAWINGS

FIG. 5 discloses a table which provides an example master merged service profile.

DETAILED DESCRIPTION

Disclosed herein is a system and method for providing dynamic and centralized service prioritization based on dynamic classification, registration, integration, and operation of a plurality of communications services such as one or more telephony, data, and/or video services. This system may be provided across multiple domains and for multiple providers of communications services. The system described herein may further provide for integration of user profiles (parameters, preferences, screening list, permissions, etc.), dynamic registration of the new services, monitoring of state across multiple services, and dynamic service prioritization and directed message distribution to appropriate services.

Figure 1:
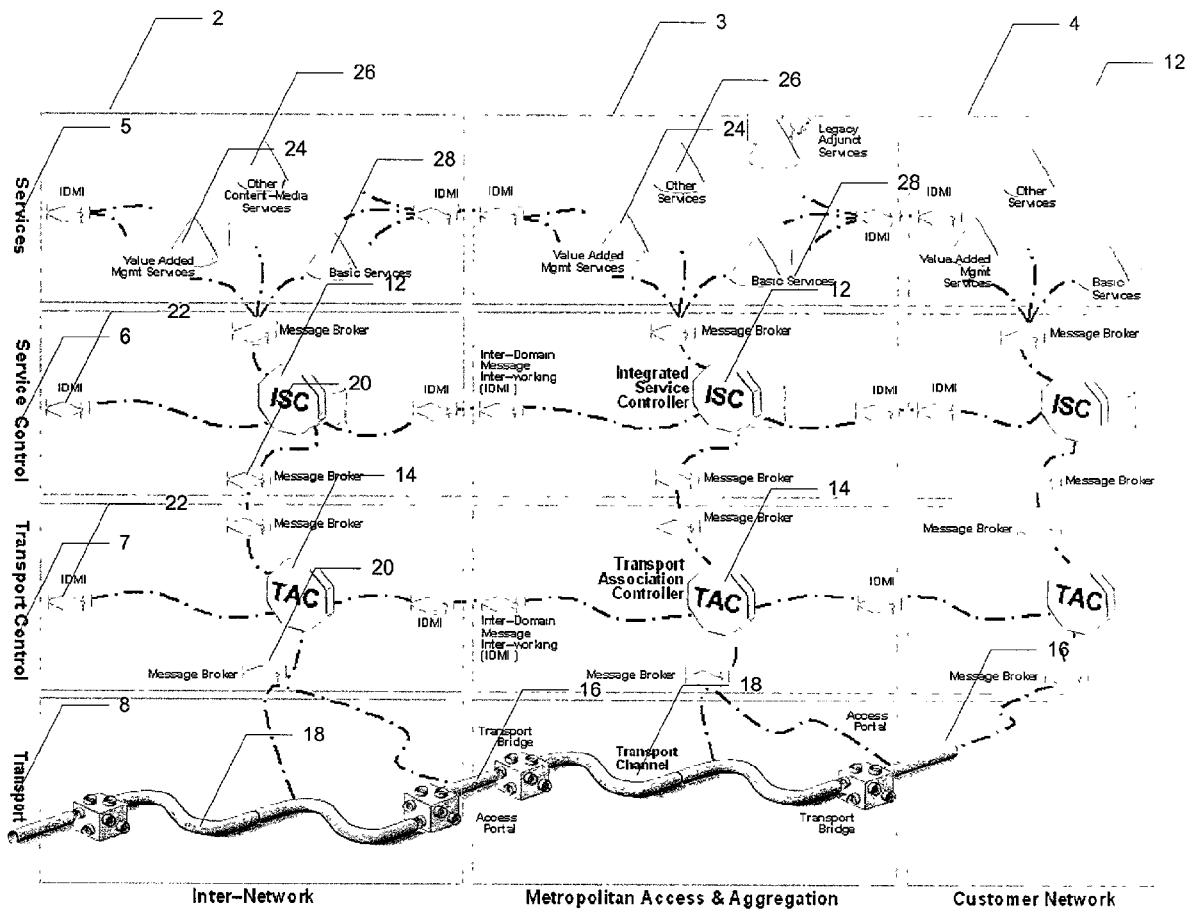
FIG. 1 discloses a system diagram for the service control functional architecture.

Disclosed in FIG. 1 is a diagram for a functional system architecture for providing the type of functions described above. The system 10 is displayed in a gridded manner in order to better understand the nature of its operation. Included in the system are one or more Integrated Services Controllers (ISC) 12. The ISC performs functions with regards to the dynamic classification, registration, integration, operation, and prioritization of communication services. In one configuration of the invention, one ISC would be related to each customer, however each ISC would support multiple levels of child ISCs. For example, one ISC night be related to each person in a family with a "parent" ISC representing the entire family. In a business setting, one ISC would represent each person in a company with "parent" ISCs representing the hierarchy of teams, departments, divisions, and the company as a whole. This invention supports an unlimited number of ISC hierarchy levels. As is seen, the ISC 12 operate in Service Control layer 6.

Below the Service Control layer 6 is a transport control layer 7. The Transport Control layer embodies functionality that manages lower layer media transport resources. Transport Control layer 7 also defines the communication state model. This control functionality is incorporated in a number of Transport Association Controllers (TAC) 14.

Below the Transport Control layer 7, is the Transport layer 8. The Transport layer may comprise any number of Transport Channels 18 for communication such as the public switched telephone network (PSTN), optical switching networks, the Internet, local area networks (LAN), or any other data network which includes any number of Access Portals 16 for media transportation between domains which may be monitored by the TAC 14.

The Services layer 5 embodies all of the "packaged" services delivered by a communications service provider, whether to end-users or other customers (wholesalers, interexchange carriers, etc.). Each service provides a set of capabilities that either directly manipulates and controls the underlying transport or augments other services that manipulate transport. In the scope of the present invention, a service provider is any entity that delivers one or more services to the customer. With regards to FIG. 1, service providers may include those who provide basic services 28, other content/media services 26, and value added management services 24.

Communication between the various layers is facilitated by Message Brokers 20. The Message Broker may be configured in any number of ways but is typically a signaling gateway configured to communicate across one or more control networks.

Returning again to FIG. 1, it is also seen that the various components of the system exist in vertical columns, which represent the domains over which the various system components may communicate. One domain shown includes internetwork domain 2 which may comprise such networks as IP-based networks with hosting capabilities or a long distance telephone networks. The metropolitan access and aggregation domain 3 may comprise the ILEC of Internet access networks. Finally, the customer network may include subsystems such as LAN's, PBXs, CTI, ACDs, servers, desktop personal computers, or simple telephones. In order to facilitate communications between the various domains the system includes Inter-Domain Message Inter-working (IDMI) apparatus 22. Capabilities of the IDMI apparatus include message translation, message security (with possible encryption), and non-repudiation capabilities.

Figure 2:
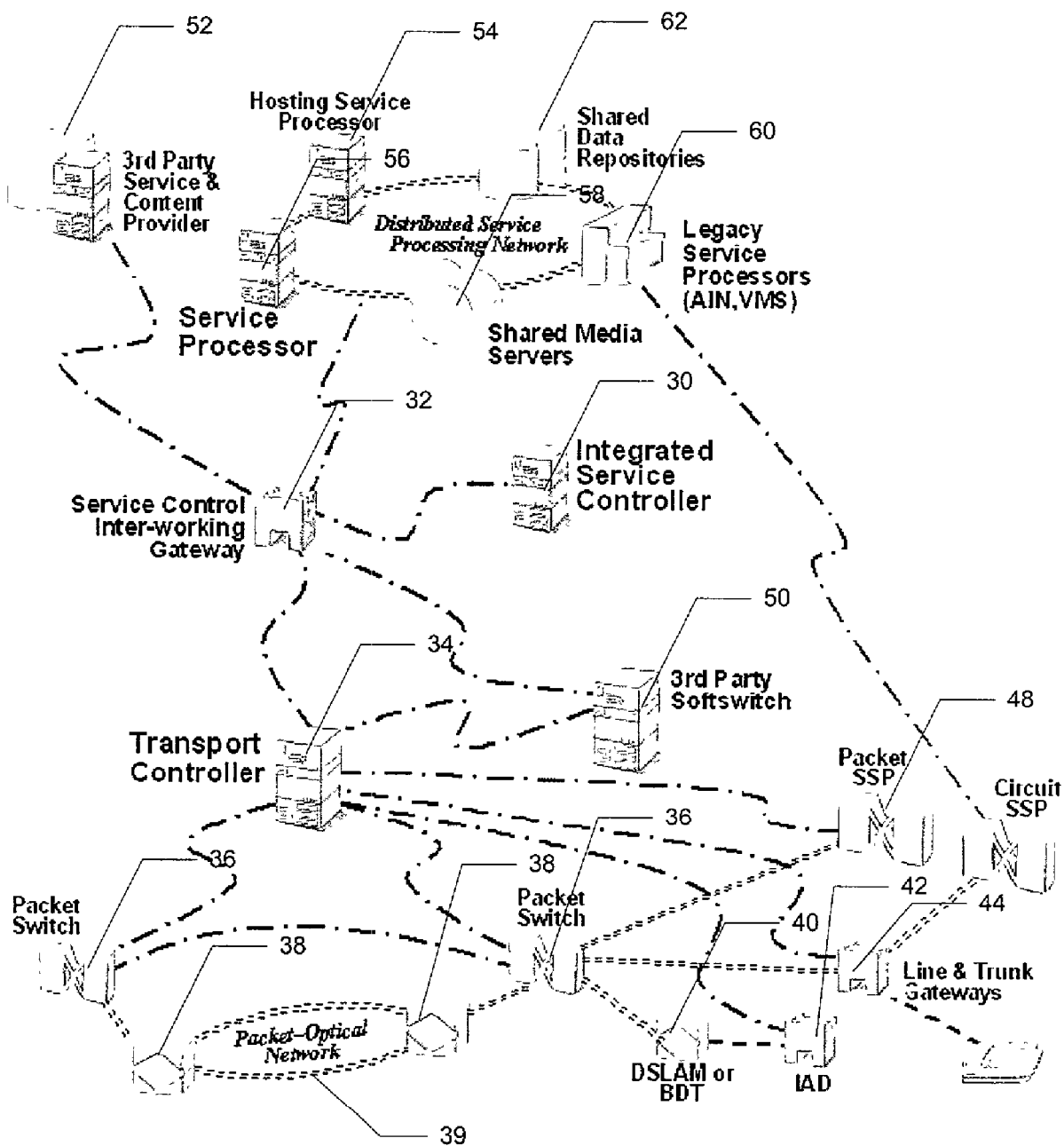
FIG. 2 discloses a system diagram for one configuration of the service control systems (physical) architecture.

Disclosed in FIG. 2 is one example configuration of the system which provides dynamically integrated communication service control as described herein. Included in the system is Integrated Service Controller (ISC) 30 which may comprise a network type server platform which is connected to any number of signaling/control networks via a service control inter-working gateway 32. Through gateway 32, ISC 30 may communicate with any number of networked system components.

One connection established through gateway 32, may be to Transport Association Controller (TAC) 34. TAC 34 is configured to provide control functions for various transport type resources. TAC 34 may also comprise a network server type platform with interconnections to one or more data networks.

Continuing on in FIG. 2, it is seen that TAC 34 is in connection with packet switches 36 which provide switching for data transported over packet based (and possibly optical) network 39. The packet switches 36 are in connection with optical switches 38 located at the edge of the optical network. The switches may provide for the transmission of voice-over-data information or just data over the optical network. Control of the packet switches may be provided through packet Service Switching Point (SSP) 48 which is also in connection with TAC 34.

Other connections established with TAC 34 include connections with integrated access device (IAD) 42 which in turn is in connection with digital subscriber line access multiplexer (DSLAM) 40 for packet broadband access (combined voice, data, and video capabilities).

Still other connections established with TAC 34 include lines and trunk gateways 44 which are part of the next generation Public Switched Telephone Network (PSTN). The gateways 44 provide for the establishment of telephony connections over the PSTN by parties employing the telephone 45. As can be seen, a connection can be established from gateways 44 or to one or more circuit SSP 46. If the SSP 46 is part of an SS7 type telephony network, further connections may be established to components of the Advance Intelligence Network (AIN). Other connections establishable through gateway 32 from ISC 30 are to the various platforms employed by communications service providers. In one configuration of the system architecture, individual services have the capability to execute on different service processor platforms in a distributed processing environment. It also provides for a degree of interworking with existing legacy service platforms (such as Advanced Intelligent Networks (AIN) and/or a Voice Messaging System (VMS)), and support for independent third party service and content providers.

As part of the configuration of the invention shown in FIG. 2, the communication service provider may operate a distributed service processing environment, wherein the processing network may include a number of internal components such as Service Processor 56, Shared Media Services 58, Hosting Service Processor 54, Legacies Service Processors 60 which support functions such as AIN and VMS, as well as a Shared Data Repository 62. Also, the communication service provider may be configured as a $3^{rd}$ party service and/or content provider. As such, connections from the ISC through gateway 32 may be established to a third party service and content provider 52 configured on a network server platform.

Alternatively, one skilled in the art would realize that the functionality disclosed in the components shown in FIG. 2 may be implemented in any number of configurations. More specifically, multiple system elements could deliver the functionality of the ISC, the TAC, and the communications services. Also, system elements could be configured to deliver two or more functional capabilities on a single platform as long as the interfaces between those functional objects are preserved. For example, individual communication services and the ISC functionality could both execute on the same platform. Likewise, the inter-domain message interworking (IDMI) function, the message brokers, and ISC might all be delivered on a common system platform as long as key interfaces between each functional capability is preserved.

Figure 3:
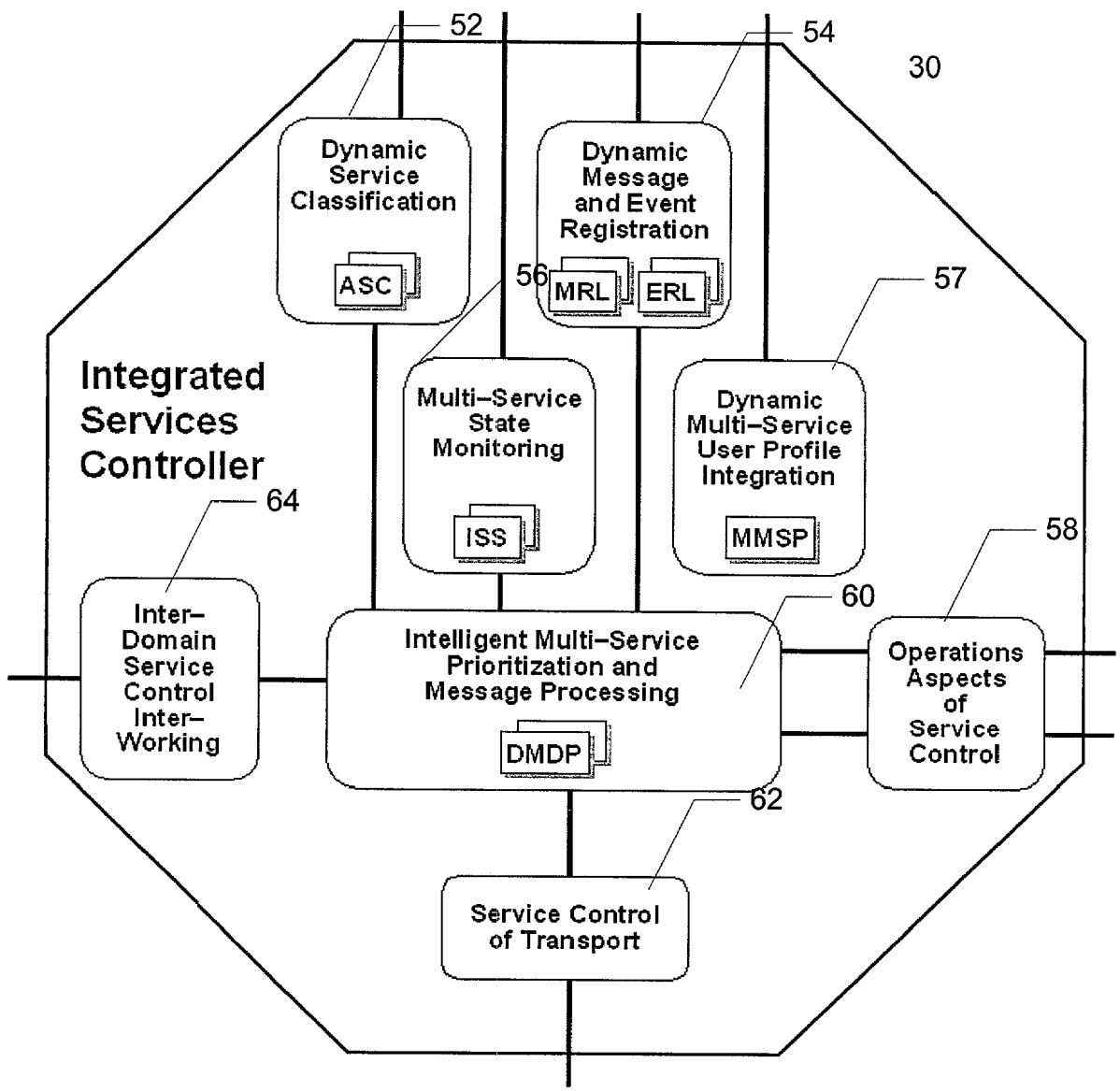
FIG. 3 discloses a functional block diagram for the Integrated Service Controller (ISC).

Disclosed in FIG. 3 is an internal block diagram for ISC 30 which shows in particular various processing modules employable by the system in performing the functions described herein. Specifically, included in the processing modules are a dynamic service classification and registration module 52, a dynamic multiservice user profile integration module 54, a multiservice state monitoring module 56, an intelligent multi-service prioritization and message processing module 60, service control of transport 62, operations aspects of service control module 58, and an inter-domain service control and interworking module 64. In short, each of these modules provides for the dynamic integration of multiple services, organization of the customer preference information with regards to the communication services, the monitoring of the transport, and the intelligent prioritization and distribution of messages.

With regards to the dynamic service classification module 52, every service performs its actions relative to one or more events that occur in the system. Predominantly these events will occur at the Transport Control layer relative to messages and state information embodied in the control of communications transport resources. Events can also occur independent of Transport and/or Transport Control. An example may include: clock-based timers (within a service, or external to a service). In the simplest case, an event occurs which creates a message that invokes a service. The service performs its actions—which may include sending and receiving one or more messages to other functional objects in the system—and then concludes. These messages may be directed for the Transport Control layer or for other services.

For the system, to support services that are created on-the-fly (i.e. dynamically), that is, after the service controller (ISC) is deployed, each service must have a way to notify the ISC of the messages that it needs to be notified of. The ISC may have a dynamic method to determine, when two or more services request notification for the same message, whether all, some, or just one of those services receive notification in the ordered sequence or all at the same time. Thus, the ISC needs a way to classify each service to determine the order to relay a message notification to services when two or more services register interest in any same message.

These requirements lead to the execution of a number of internal processes. Each process occurs when a service is activated (provisioned) for a specific customer. Disclosed in FIGS. 4a-d include flowcharts which describe in general and also in detail the processes performed during the initiation, classification, and registration process. A first process performed includes service activation and initiation. Every service for a customer—including dynamically provisioned services—is always activated through one or more action messages (commands) from a provisioning function. Even if some other event or service in the system requests activation of a service that action request must first flow through a provisioning function that checks for authorization (is the customer able to order that type of service and has the customer paid their bill?), availability (is it a service being sold that day and available to that customer?), and any other appropriate service ordering and activation parameters. This also initiates appropriate Fault Management, Configuration Management, Account Management, Performance Management and Security Management (FCAPS) (operations) capabilities to allow the service provider to properly manage the service.

Once a service has received the appropriate activation commands, either directly from the provisioning system or via the ISC, it is initiated. The initiation process can be performed in multiple ways. One option is for the provisioning function to initiate the service on behalf of the service. In another configuration of the invention, the service initiates itself with the ISC directly.

After initiation of a service, the ISC needs to determine the service's classification and the one or more messages that the service needs to be notified about. The steps performed in the dynamic service classification process are disclosed in the flowchart of FIG. 4b. In a preferred embodiment of this invention both of these capabilities are performed automatically between the service and the ISC. Automatic Service Classification (ASC) is based on a service's capabilities wherein the service declares its capability sets to the ISC which will result in an ASC across one or more categories. The ISC then, based on any of numerous possible algorithms, will use a service's ASC information to determine how to prioritize (order) services for each message that the ISC processes. The message types which a communication service wishes to receive are then identified. Possible embodiments of ASC categories are detailed below.

Automatic Service Classification, through a dynamic message exchange between the service and the ISC, may require more than one iteration to fully determine a service's capabilities and appropriate classification. While it begins with the service declaring its self-determined classification based on criteria categories like those listed below, it might also involve subsequent inquiries from the ISC with responses from the service. This dynamic service classification and negotiation dialog is employable in enabling dynamic service registration and plug 'n' play. After sufficient negotiations have been performed the ISC will determine a final ASC for the service. Service classification categories, and their possible parameters include, but are not limited to what is disclosed in the following table:

| Service Classification | | |
|---|---|---|
| Service Classification Categories: | Parameter Values: | Examples-Description: |
| Service Identity | Names<br>Aliases<br>Globally Unique Digital Identifiers | Means of uniquely and unambiguously identifying and referring to a particular service (implies a means to authenticate Identity also) |
| Emergency Priority | Government-Public Emergency Service<br>Individual-Personal Emergency Service<br>Government-Public Warning Service<br>All Other Public-Private Services | GETS<br>911<br>Emergency Preparedness . . . |
| Service Provider | Local Domain Provider (Home)<br>Guest Provider in Local Domain<br>Foreign Provider in Another Domain | Who is providing the service and therefore how much should the service be trusted-secured |
| Dependency | Independent Service<br>Service Modifies Behavior of another service<br>Service Behavior is Modifiable by other objects<br>Service Collaborates with another service | Specifies dependency to another specific service |
| Connectivity (Mode) | Connection-Oriented (CO)<br>Connectionless (CL) | Whether a communication association requires specific: 1) establishment, 2) transmission, 3) disconnection stages (CO), or, is single message oriented (datagram transmission) without specific establishment and disconnection stages (CL). |
| Manipulates Transport Associations Bearer Content | Yes<br>No (e.g. a Read-Only Monitor service)<br>Possible additional transport-specific parameters | Does the service directly manipulate transport bearer content (e.g. 2-way call, video streaming, Dynamic DSL, . . . ) |
| Augments Control of Transport Associations | Yes<br>No | Services that augment, or might change control behavior of, a "basic" association service. Call Waiting, Instant Message No Solicitation, and URL Screening are examples. Key notion is that they modify existing associations established by a service that "Manipulates Transport" |
| Type of Association Augmentation | Screening Inbound Associations<br>Screening Outbound Associations<br>Routing<br>Bandwidth Control (Thruput Rates)<br>Latency/Delay/Priority<br>Other Performance/QOS modifications | |
| Association Media Type | Voice<br>Video<br>Information<br>Multi-Media | |
| Association Flow | One-Way (Stream)<br>Two-Way (Dialog)<br>Multi-Way (Conference) | Drives basic Association Topological Configurations. |
| Message Source | Only Msgs within the same domain<br>Messages from other domains | Where is the message originating from? |
| Service Invoker | Only Msgs within the same domain<br>Messages from other domains | "Who" can start the service |
| Service Privacy | Private<br>Restricted Visibility<br>Public | To what degree can other services know about "me" |

-continued

Service Classification

| Service Classification Categories: | Parameter Values: | Examples-Description: |
|---|---|---|
| Remote Use | Local/Home Only<br>Remote Only<br>All | Can the Service be invoked by an event originating outside of the Local/Home Service Provider Domain? |
| Security and Trust | Various security (or "trust") "Levels" | Functions of Authentication, Authorization, Access Control Allow or Limit various Service Capabilities and Access to Resources/Data |
| Shared Resource/Data | Read Only (or Monitor)<br>Write Only (or Manipulate)<br>Read & Write | The degree to which a service can share resources or requires dedication (or locking) of resources |
| Priority of Msg Delivery | Message Communication Priority-tbd | When congestion occurs in the signaling/control transport infrastructure, a prioritization scheme is required to ensure the Messages associated with critical time-bounded signaling functions are communicated as soon as possible. |
| Business SLA (Service Level Agreement) with Service Provider | ?<br>? | Indicates whether special consideration should be given to specific services given an SLA. |
| Events Static Registry | Event Static Info<br>Notification Interface Static Info | Any specific event information that needs to be statically maintained. Information for use by Dynamic Event Notification Function. |

Further, a Service Message Registration (SMR) process may be performed. The steps performed for this dynamic message and event registration process is described in the flowchart of FIG. 4c. Each service identifies to the ISC the complete lists of all messages—a Message Registration List (MRL)—it is interested in along with any additional parameters (state, settings, originator of messages, etc.) that it needs in order to process the message.

In addition to communicating a Message Registration List (MRL) to the ISC, each service may also communicate an Event Registration List (ERL) to the ISC. While messages and events are related, they do not necessarily comprise a one-to-one mapping, though the relationship between many events is a one-to-one mapping to a specific message for that event. The ERL from each service defines the specific events that the service needs the underlying transport resource (i.e. Transport Control and Transport layer functions) to monitor for and the MRL defines the specific messages that the service expects to receive. The ISC re-registers the ERL with the Transport Association Controller (TAC). The ISC applies its internal processing intelligence to dynamically order each service for each message to determine their relative priority. Because the current state of services is constantly changing, so too the message distribution order may also change from moment-to-moment. The ISC stores the results of its intelligent processing in a Dynamic Message Distribution Prioritization (DMDP) for each message.

Figure 4A:
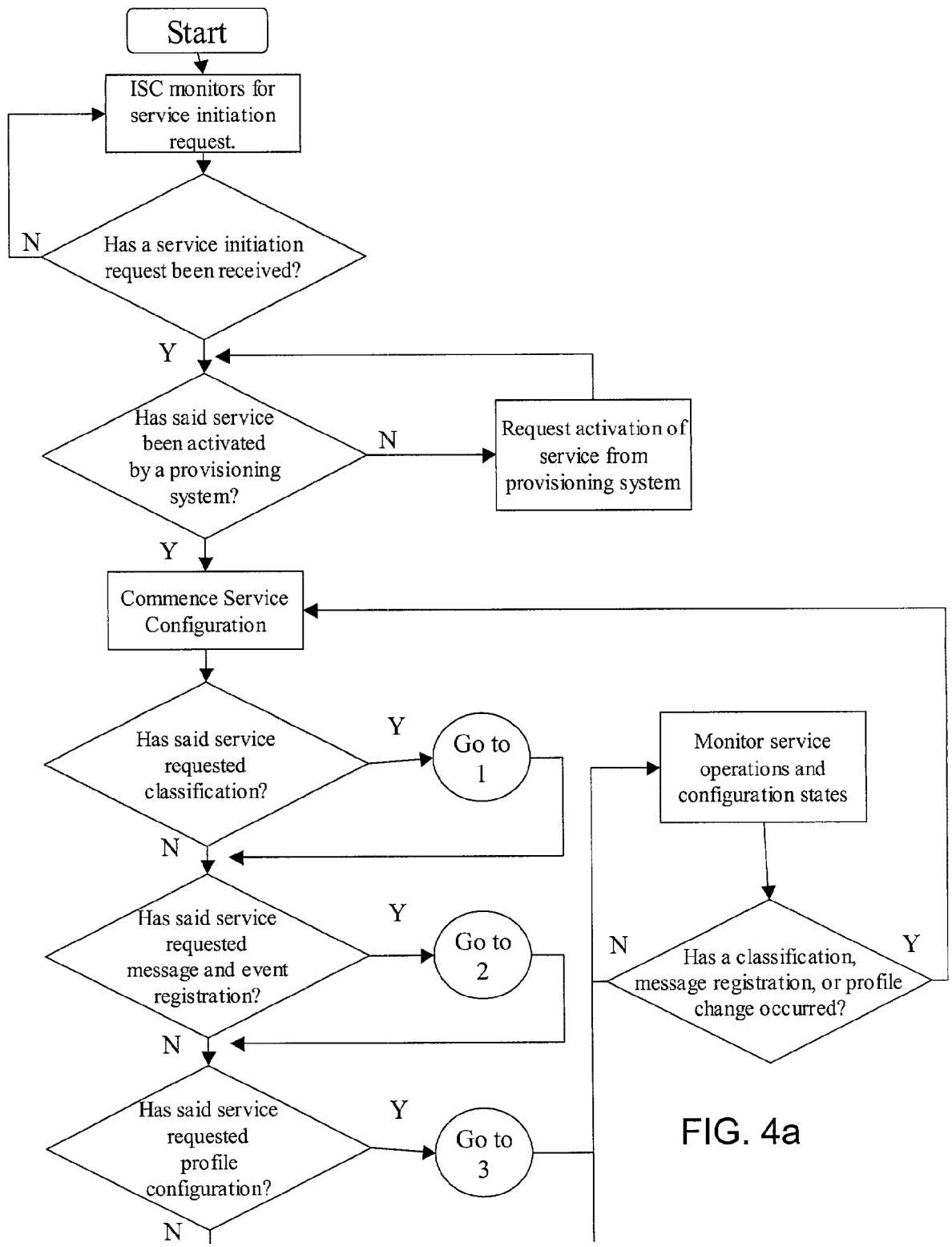
FIG. 4a discloses a flowchart in which describes the overall steps performed during automatic service initiation, classification, registration, and integration.
Figure 4B:
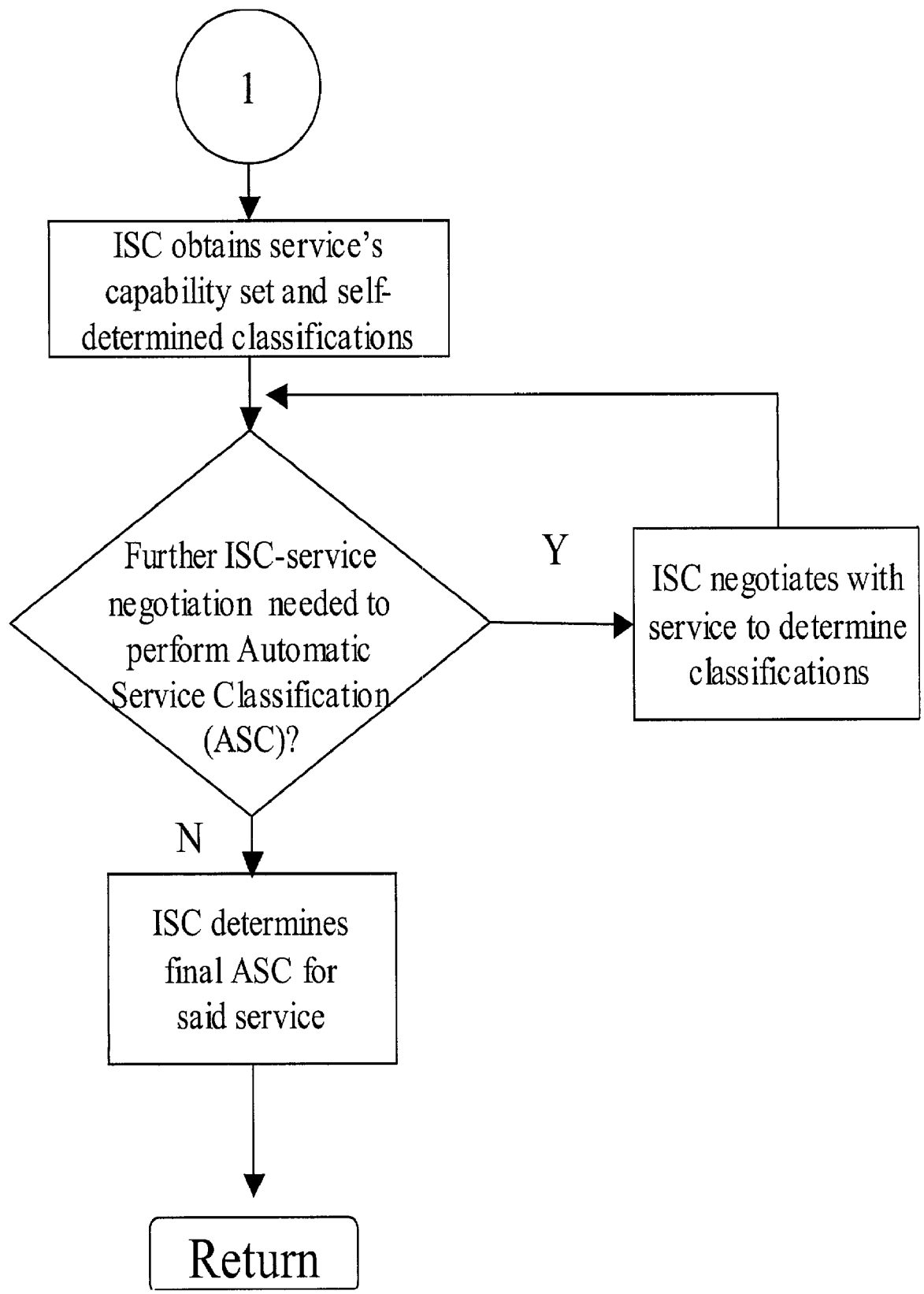
FIG. 4b discloses a flowchart for dynamic service classification.
Figure 4C:
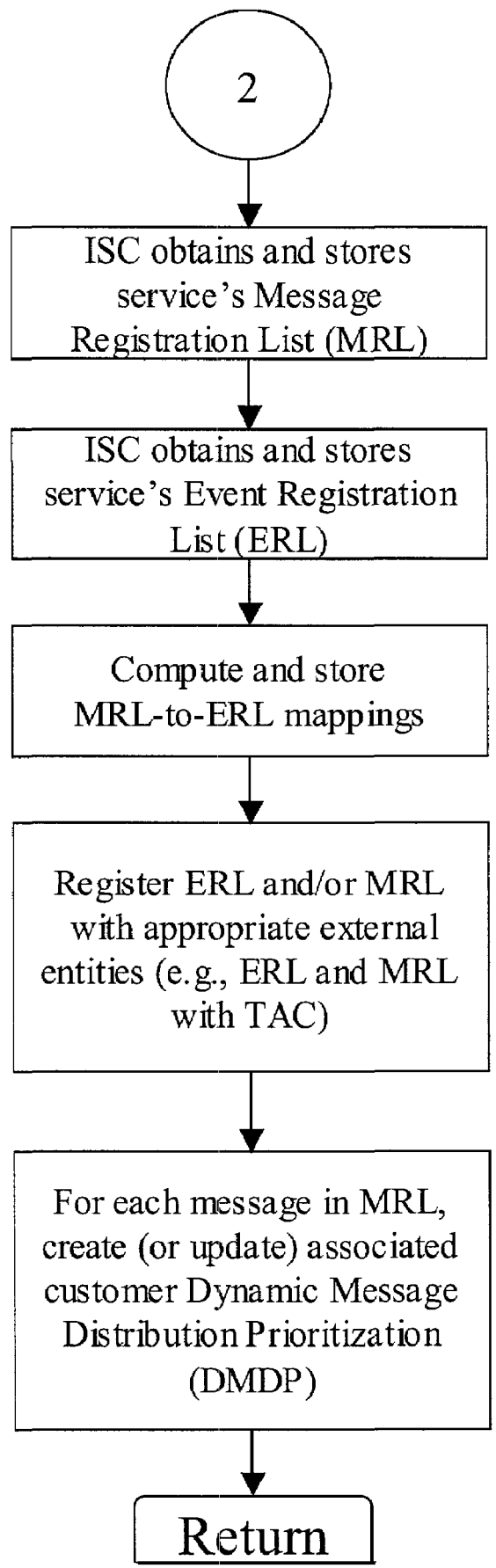
FIG. 4c discloses a flowchart for dynamic message and event registration.
Figure 4D:
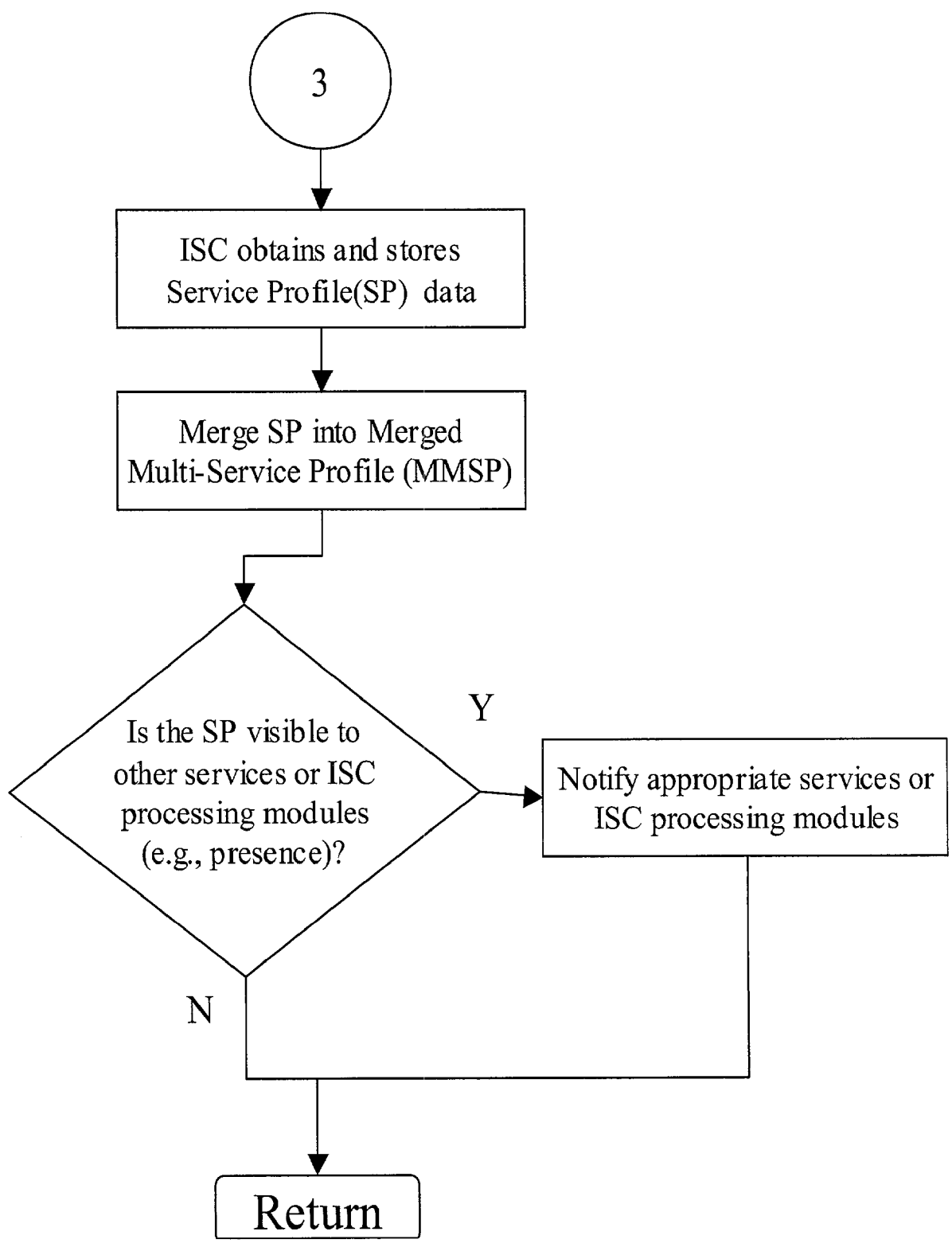
FIG. 4d discloses a flowchart for customer and service settable profile integration.

Once services are registered and integrated, a profile for a user may be defined through use of dynamic multi-service user profile integration module 54. Disclosed in FIG. 4d is a flowchart which describes the process performed for customer and service settable profile integration. Most existing communications services store information (parameters, preferences, screening lists, etc.) defined by the customer. This may be done using proprietary formats that are only visible to the communications service itself. As a result, a customer may be forced to enter the same keyed data (e.g. telephone number) over and over again for each of the different services.

According to the invention described herein the dynamic multi-service user profile integration module 54 provides a means for generation of a Merged Multi-Service Profile (MMSP) like that illustrated in FIG. 5. Each communications service will manage a Service Profile (SP) that contains one or more of the Master Key Fields and may comprise one or more Service-Specific Fields which is dynamically merged with the MMSP by the ISC. As a result, customers do not need to interact with each service individually to set their profile screening list and preferences which would require re-entering data for the Master Key Fields for each service. Instead, the ISC provides an integrated user interface (graphical, auditory, textual, touch-tone, etc.) to the MMSP where the customer can easily configure all services at once, having to edit the primary keys for each entry only once.

As can be seen in FIG. 5, the MMSP 200 illustrates an example of an MMSP with multiple columns of information set for multiple rows of both service and customer entries. The rows in the MMSP are divided into two sections (230 and 232) with the upper section representing service-settable parameters and the lower section of rows representing customer-settable parameters. Alternately, the MMSP might be implemented as two or more separate tables supporting the same functional capabilities and integration.

The customer-settable rows, for example, might represent incoming callers the customer wants screened against criteria illustrated in the Service Specific Fields (columns 214-226). Alternatively, the rows could also contain entries with one or more Master Key Field identifies (e.g. phone numbers, IP addresses, e-mail addresses, etc.—columns 204-212) that define possible communication entities (e.g. other people or web sites) for which a particular service should perform a specific set of actions. Regardless of what actions (screening, forwarding, etc.) that a service performs relatively to entries in its SP, the MMSP provides a merged information structure that allows the customer to enter individual entries, and their Master Key Fields, only once across all of that customer's services.

The service-settable rows in MMSP 200, for example, might represent device state or location information for the one or more devices associated with a customer. Each service may also define a visibility attribute 228 which allows the system (ISC or service) or the customer to restrict access to specific fields for other services. While the ISC might present an integrated viewable user interface of the MMSP (like that shown above) to the customer it may be necessary to not allow specific services to "see" or access information managed by other services. This visibility may only apply to other services registered for the customer—not other services registered for other customers, or visibility to other customers. "Phone number" or "Identification" privacy is orthogonal to this attribute—and could, in fact, be implemented as another specific service. One embodiment of the integrated MMSP might be a LDAP (Lightweight Directory Access Protocol) directory, though other technologies would also be suitable.

The MMSP could physically be implemented in a variety of ways. Preferably the ISC only maintains a "snapshot" copy of each service's individual SP. This snapshot is updated each time a customer adds or deletes a service or edits the data within the profile. The Master copy of each SP should be maintained by each service. In an object-oriented implementation the MMSP would be contained within the ISC as part of its internal data. Alternately, in a process-file-oriented implementation the MMSPs for each customer ISC could be implemented in a centralized database.

Today instant messaging services provide presence and availability information indicating whether a user is online and whether they allow that fact to be known by other users. The wireless world is quickly moving toward location-sensitive services that deliver information (notices, advertisements, etc.) to customers based on their immediate location (e.g. ads as they walk by a store). In both cases, these presence and location sensitive capabilities are typically isolated to those vertical service areas. They are not integrated with other services.

This invention supports the opportunity for a much higher degree of integration. With presence (including, but not limited to: device state, device location, device network address, device state visibility, and other device attributes), and availability ("who can see me," "what device am I, a specific person, at"), information integrated into the ISC's MMSP then other services can access that presence and availability information to effect their processing.

In a preferred embodiment of the invention, the presence and availability information would be managed by a Presence and Availability service (or two or more services for Presence, Availability, or other related information) in the Service Layer. This service, or services, would merge their data with the ISC's MMSP and make it available to other services (i.e., make it "visible") or the Presence and Availability Service might register its data with the ISC, similar to Service Classification and Message Registration. The exact mechanism is left as an implementation option. The Multi-Service S ate Monitoring module 56, along with registering communications services with the ISC, is also configured for monitoring the "high level" state of each service (e.g. active/inactive, setting up/processing/completing, etc.) The ISC monitors the "high-level state" of each Service Director it has registered.

This is different from the association finite state model embodied in Transport Control. The high-level state might include the possible values: Idle, Setting Up Association, Association Established, and Releasing Association. These state values are very generic and probably apply to all types of association,; (data, voice, video). It is important for the ISC to monitor (be informed of) the current state of each service, as another factor influencing intelligent message prioritization. It is important to note, that not all services, in fact, few services, might progress through all the states listed above. Many services will only support one or two high-level state s relative to an association.

For example, consider the simple service example of 2-Way Call, whether over packet or circuit. In a preferred embodiment of this invention the first call (whether outbound or inbound) employs a 2-Way Call Service. When another party attempts to call the customer a second Transport Channel (at the Transport layer) is created which attempts to connect with the customer's Access Portal. A "termination attempt" event is detected and a corresponding message sent from Transport Control to the ISC. The ISC knows that the 2-Way Call service is in an established association and given its prioritization rules (since no Call Waiting is present) delivers the termination attempt message to the 2-Way Call Service. The 2-Way Call Service, unable to handle N-Way Calls, returns a "busy and deny connection" message to the ISC which relays it to the Association State Manager (ASM). The ASM provides the actual state model for controlling a specific transport association. It also manages the relationship between a Transport Channel (TC), a Transport Channel Access Bridge (TCAB), and an Access Portal (AP).

Now let's consider the example when the customer does have Call Waiting in addition to 2-Way Call—a service set that all customers, whether business or residential, whether over packet of circuit, can use. In this case, when the ISC receives the "termination attempt" message from the ASM for the new call, it uses the state information from the first call to determine that "when a 2-Way Call is in progress AND Call Waiting is available, send the message to Call Waiting, otherwise send it to 2-Way Call." Of course, rules like this would be expressed in generic terms not product specific terms. The ISC would send the message to the Call Waiting service which embodies the logic for what kind of indicator (auditory, visual Caller ID, recorded intro from the new caller, or perhaps even the new caller's photo) to send to the customer. In turn, the Call Waiting service would manage the hand-off between the first 2-Way Call and the second 2-Way Call. In this example, the ISC's knowledge of monitoring the state of each service directly impacted the rules for intelligent message prioritization.

Intelligent Multi-Service Prioritization and Message Processing module 60 provides for the processing of messages exchanged between the various entities of the system. Specifically there may be at least three types of service-related messages employed for exchange between services, the ISC, the TAC, and other objects—collectively referred to as entities. These include:

Inform Messages: wherein one entity wishes to inform, that is, notify another entity about something in the system, one common situation is that an event has occurred. These messages may also include multiple data items (e.g. state information, parameters, current variables, etc.) that the requestor of the event notification might have asked for.

Request Messages: One entity requests information or instructions from another entity.

Instruct Messages: One entity instructs another entity to perform an action. This includes an entity instructing another entity to "watch for" an event and then return an Inform message (notification) along with specific data when the event occurs.

The ISC is operative to prioritize and appropriately dispatch all messages, whether those messages are directed to a service or to a Transport Association Control entity. This assures that each message is delivered to one or more services in priority order. A Dynamic Message Distribution Prioritization (DMDP) is created by the ISC for each message and is employed in the processing for each message registered with the ISC. Criteria employed in the creation of the DMDP may include:

Automatic Service Classification (ASC),
ISC Service Provider Policy (SPP), and
Customer Classification (CC) (see below)
Customer's Preference Order (CPO) (a service priority list customized by the customer),
Current State of Services,
ISC Service Prioritization Rules (SPR)—which could differ for different embodiments of an ISC.

Possible Customer Classification (CC) categories may include, but are not limited to:

rules determine how the ISC dispatches a message. The possibilities may include: dispatch only to the first service (in priority order) or to dispatch to each service in sequential order waiting for the previous service to indicate service completion, dispatch to each service in sequential order waiting for the previous service to indicate current message action is complete, dispatch to all services simultaneously, dispatch to specific services in list (a sub-list given current state . . . ), and dispatch only to the last service.

In addition to determining the prioritization of services for delivering a specific message, the ISC must also determine the destination—that is, the appropriate service instance to which the message should be delivered—for each message.

For messages directed to Transport Association Controllers (TACs) a similar type of message management is provided by Service Control of Transport module 62. The ISC relays messages to, and receives messages from, one or more TACs embodied in the Transport Control Layer.

Figure 6:
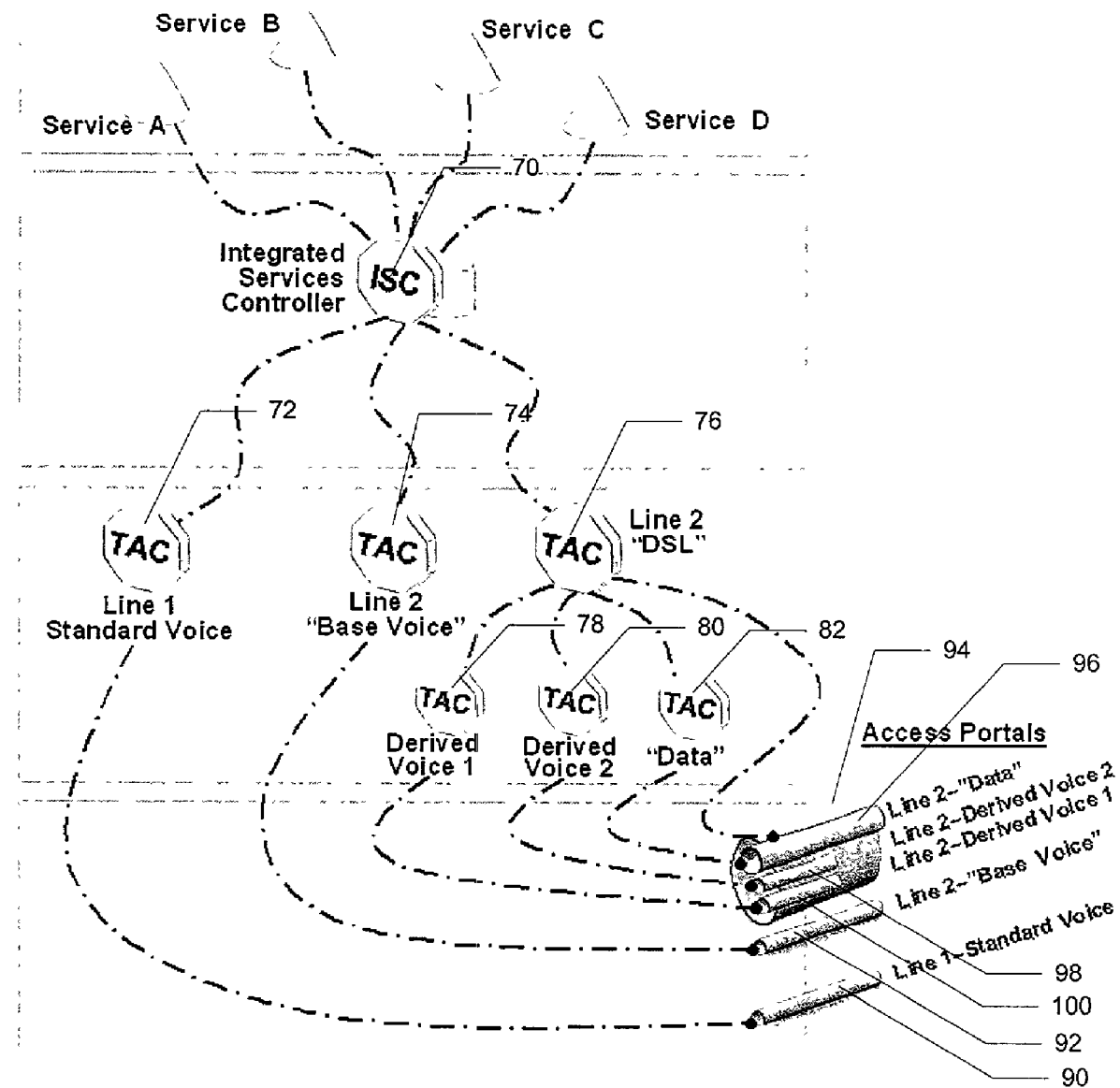
FIG. 6 discloses a system diagram which shows the interconnection between the Integrated Service Controller (ISC) and Transport Association Controllers (TAC).

Disclosed in FIG. 6 is an example configuration of these capabilities. It shows the connection between the ISC 70 and the plurality of TAC's 72-76. Each Access Portal provisioned for the customer has one and only one TAC associated with it. Access Portals carry the "bearer" content of an association across domain boundaries. Each access path (i.e. wireline,

| Customer Classification | | |
|---|---|---|
| Service Classification Categories: | Parameter Values: | Examples-Description: |
| Customer Priority | Platinum Customer GOLD Customer Silver Customer Bronze Customer White Customer | An overall rating defined by each network domain provider (owner) that reflects the overall priority for each customer. The ratings might permeate the service architecture (e.g. Platinum messages between objects are always delivered before other levels . . . ). This rating might reflect how much money the customer spends on services. |
| Customer Billing Status | Paid/Current Overdue Delinquent Termination In-Progress Terminated | This may reflect whether the customer pays their bill on time each cycle, or whether they are habitually late, or delinquent . . . |

The customer classification criteria may be stored within and determined by the ISC, however, in a preferred embodiment this customer information is managed by an operations support system performing customer accounting functions. The operations function is operable, through one or more messages, to exchange customer classification information with the ISC as well as other system entities. The ISC uses the customer classification information as one of possibly multiple criteria to determine the relative prioritization of services wanting to receive the same message. Other system entities, like a Message Broker (MB), might use customer classification as one of possibly multiple criteria to determine the order to relay messages it receives on to other system entities.

In most cases the ISC will route a message intended for a service to the first (top priority) service in the DMDP for a specific message. In other situations, the DMDP might define an "application chain" of services that will receive a message in sequential order. The combination of the classifications, service provider policies, customer preference order, the current state of each service, and the ISC intelligent prioritization wireless channel, DSL channel, T1 channel, ATM, etc.) in or out of either side of a domain (e.g. customer terminating line, inter-exchange carrier trunk facility, . . . ) is modeled as an Access Portal (AP). Each AP represents (and can communicate to other objects) the characteristics of that portal including, for example, its physical transport capacity, its current transport utilization, the media formats it supports (including built in CODECs or format converters), etc. It also embodies a simple state model for transport "flow" (either a "circuit connection" at an electrical level, or packet flow).

In the example shown, TAC 72 is associated with a wireline Access Portal 90 configured for standard voice. TACs 74 and 76 are associated with another wireline configured for a "base voice" Access Portal 92 with a DSL Access Portal 94 that uses the upper frequencies on the same wireline. Because DSL line 94 is configured to operate according to multiple modes of communication, in this case voice lines 98 and 100, and data line 96, Access Portals are assigned for these lines which in turn are monitored by TAC's 78, 80, and 82 respectively. As such, customers with multiple Access Portals (e.g. PhoneLine 1, Line 2 as a DSL service with a separate "base voice" portal, 2 derived voice portals, and 1 data portal would have 6 TACs) would have multiple TACs associated with each ISC.

FIG. 6 illustrates some of the primary functions of the system, with the following paragraphs describing their basic operation. Once the one or more communication services are activated and initiated (which includes the classification, registration, and integration steps described above), and the ISC has relayed message registration (the MIL) and event registration (the ERL) to the TAC, the ISC is operative to monitor the state of the one or more services for its customer and to receive messages. Messages received by the one or more TACs may invoke an event to occur, or other non-message related activity may invoke an event. The corresponding TAC then processes the event against its Event Subscriber Registry (ESR)—the compilation of multiple Event Registration Lists (ERLs) from multiple services—to determine whether any services have registered interest in that event and what messages were requested. The TAC generates the appropriate message(s) and relays it (them) to the ISC.

Figure 9:
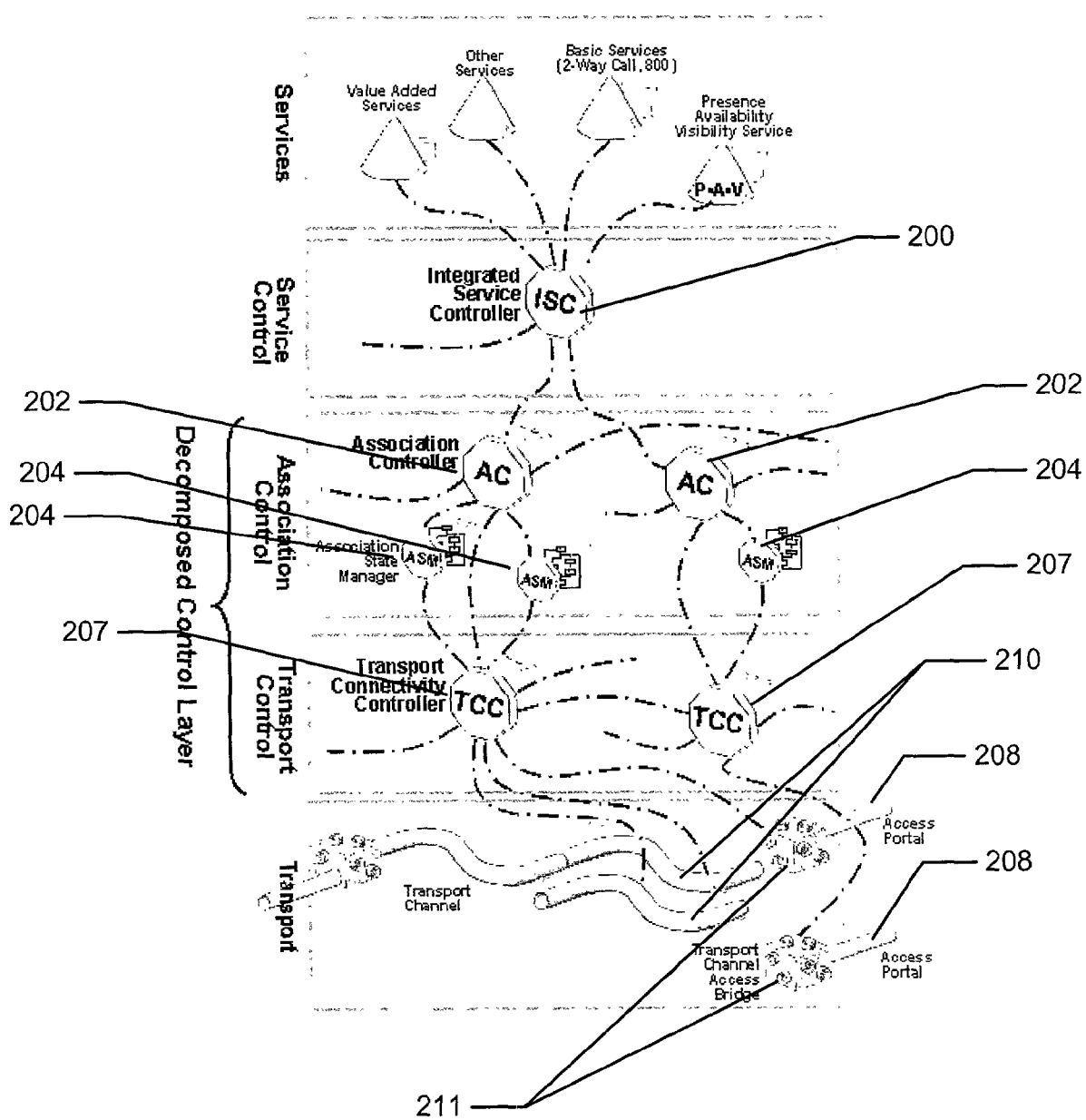
FIG. 9 discloses a system diagram which shows the interconnection between the Integrated Service Cotroller (ISC), the Association Controllers (AC), and the Transport Connectivity Controllers (TCC).

Referring again to FIG. 1 it was shown that the transport control layer included at least a one TAC. Disclosed in FIG. 9 is a decompressed version of the transport control layer which now is shown to include an association control layer with a transport control layer. Shown in particular is at least one association controller (AC) 202 interconnected in the network between an ISC 200 and a transport connectivity controller (TCC) 207. It is further seen that the TCC 207 is in communication with various components of the transport layer.

With regards to the association controller, an Association Control function manages both "connection" and "connection-less" communications. It enables service convergence across data, voice, and video media independent of the underlying transport and the service logic that drives it. In essence, it provides a flexible session context for relating communicating parties (e.g. customers), engaged services, and related transport resources. Association control should be viewed as a separate and distinct mechanism in which associations are coordinated and controlled, independent of related services and transport communication resources. Associations are a common view of the relationship and state representation of a user's presence interacting with other parties and the multiple services and abstracted transport resources engaged during the communication session amongst the parties.

Unified association control is an enabler to provision customers with innovative services that seamlessly interoperate. For example, an enterprise business customer could be provisioned with an IP access management service (i.e., dynamic bandwidth control and allocation) integrated with a VoIP Centrex suite of services, where each service is possibly deployed on separate systems. The common association control allows the enterprise customers' users the ability to launch, suspend, resume, and end customized VoIP Centrex services that in turn screen, merge, bridge, route, manipulate characteristics of, and monitor packet streams in a coordinated and seamless manner while utilizing a common IP broadband access medium. Coordinated control of IP access and other service layer transport resource requirements enables new product ideas, e.g., during busy inbound calling periods, allow business customers to define service policies that automatically re-allocate more bandwidth for VoIP calls to the sales department and throttle down Web-access for the production department.

According to the invention described herein the previously defined Transport Control function may include both Association Control and Transport Control functions. A distinct and separate Association Control function provides the building blocks that allow higher-level service intelligence to cooperatively interoperate and uniformly control and coordinate transport resources (access portals, bridges, and channels). Inter-operating with the service Control function ("above" it) and the Transport Control function ("below" it) the Association Control function comprises both an AC 202 and a separate ASM 204. Together these functions orchestrate the launching, suspending, resuming, modification, and ending of service intelligence relative to communication relationships between parties. Furthermore, the AC and ASM abstract for services the ability to control, manage, and affect transport resources in a service and technology neutral manner. The Association Control function further controls and coordinates transport resources via interfaces to the Transport Control function. The Transport Control function provides abstraction of technology specific Transport functions for the reservation, connection, modification, monitoring, bridging, mixing, multiplexing, and releasing of transport resources for flexible bearer-path connectivity control. The diagram of FIG. 9 shows the distinct separation of an Association Control function from the Transport Control function achieved through further decomposition of the service functional architecture.

For each customer of the communication service system, an AC is provisioned as the initial point of engagement for communication associations and related services. Consequently, each AC has a globally unique customer addressable identity (e.g., phone number, IP URI address, etc.) that is used in the operation of communication services for a customer. Hence, either an originating (calling party) or terminating (called party) endpoint in a communications relationship has an AC that represents the respective association processing requirements needed to interoperate with services and underlying transport functions. Furthermore, ACs create, initialize, control, coordinate, and delete Association State Managers (ASMs) in order to enable communication state management across a customer's specific service set. In turn, ASMs control (manage) the transitory communication association state (persists only as long as the represented party's services are establishing, modifying, or terminating communication relationships) which provides the mechanism in which service logic is engaged and subsequently relays abstracted requests for transport resources under direction of service logic. Effectively, the AC-ASM capabilities enable the establishment, modification, monitoring, and deconstruction (release) of communication associations for services on the behalf of customers.

Communication associations are sessions representing relationships amongst services and the respective directed flow (unidirectional, bi-directional, multi-directional) and bridging (N-way) of a particular information (media) type (e.g., data, voice, and video) between communicating parties traversing transport and access resources. The ASM manages associations instead of connections since it supports the stateful relationships between communicating parties and the services effecting the communications, regardless of the use of "connection-oriented" or "connection-less" bearer paths. The ASM also provides abstraction of transport control of the underlying transport capabilities (routing, switching, etc.), modeled as Access Portals, TCABs, and Transport Channel system entities via the Transport Connectivity Controller.

One AC is dynamically related to at least one Transport Connectivity Controller (TCC), where each TCC is directly related to one and only one Access Portal (AP). The AC-ASM works through the TCC to manage the state (availability and capabilities) and establish monitoring of transport level events (e.g., notification messages for in-band "off hook", packet count reports, etc.) of Access Portals (AP). Also, when bearer connectivity is established, the AC-ASM manages state and events of the bearer path related Transport Channel Access Bridges (TCAB) and Transport Channels (TC) functions. An Access Portal represents the logical bearer access path for a customer into the transport network of a service provider domain (e.g., Local Exchange Carrier, Inter-Exchange Carrier, CLEC, DLEC, Hosting Data Center, etc.). APs are represented by lower level network addresses that are bound to a TCC. Customer and service mobility across appropriate APs are achieved by the dynamic binding of the TCC (and indirectly the corresponding AP) with the AC that represents a customer's global addressable identity.

To support services that are provisioned for a customer, the AC receives event registration monitoring requests and message processing requirements from services through the Integrated Services Controller (ISC). This allows the AC to exchange incoming instruction messages and outgoing inform or request messages of event detection related to the communication association state (that occur within an ASM state machine) with the ISC for the requesting service. The AC maintains an Event Registration List (ERL) for all event requests that need to be monitored that subsequently result in the transmission of related messages to interested services. Furthermore, the AC maintains a Message Registration List (MRL) for all messages that need to either be delivered to or received from registered services. Event requests may be invoked by messages (signals) For establishment, modification, monitoring, or release of associations that are transmitted to the AC from other ACs, directly from services, or from Transport functions via the TCC function (e.g. "off-hook" message emanating from a corresponding AP function). Upon reception of a new association request message, the AC creates a new Association State Manager (ASM) to manage the corresponding association. In turn, the ASM inherits the appropriate event requests and message processing requirements from the AC, and executes an appropriate association state machine. When the ASM encounters events, it sends the appropriate messages to the requesting service's ISC.

Provisioning of an AC occurs when a new customer orders communication service(s) from a service provider and a corresponding AC is created and deployed through a provisioning function for that customer. The AC's ERL, MRL, and ASM capabilities that are available to services are established by a provisioning function. Therefore, services can either utilize existing events, messages, and state machines or new events, messages, and state machine constructs must be specified and deployed to an AC prior to the provisioning of the respective service that requires the additional AC capabilities. Once the base set of AC capabilities are provisioned, services can statically and dynamically register for and discretely utilize them during service execution. Moreover, multiple services can relate to the same AC. Another way to state this is that each AC can uniformly support (the event/message registrations and state machines for) multiple services, independent of the service type (e.g., VoIP telephony, media streaming, peer-to-peer exchanges, etc.).

Each Association Controller receives event registration instructions from specific Services via the ISC. The AC stores the event registration information in an Event Registration List (ERL). The ERL is a list of subscribing services interested in notification about a specific event. Each entry in the ERL indicates the globally unique name for each service, the type of message each service has requested to receive, and additional context information the service also requests to have delivered with the message (see section 1.3 below for more on context information).

The ERL stores events oriented to the originating, terminating, and modification of established associations. ERLs are communicated to ASMs during the creation and configuration (initialization) of an ASM by an AC.

ACs provide a mechanism in which Services can dynamically learn which events and related event contextual information an AC (and its ASMs) is capable of supporting. This auto-discovery is accomplished through an interactive exchange with the intermediary ISC. While many services may know of the AC capabilities a priori through the service creation and provisioning process, alternately new services might dynamically make a determination of the AC event detection and message delivery capabilities.

A service that has not been provisioned for a customer may request to receive certain events in order to apply treatment toward the customer's AP-TCAB. Pre-emptive services are a category of services that dynamically ascertain the AC event registrations and message delivery capabilities through ERL (and MRL) auto-discovery mechanisms in order to effect how and when the service may be alerted of an event in order to provide auxiliary processing. Preemptive service capability wherein one customer's service can impose itself upon another customer (or their services) is only possible if the other customer or other service has given permission to allow the "foreign" service to impose. Thus, preemptive services require constraints that account for security and resource protection.

Preemptive services would first need the proper authorization to impose on another party, then would need to dynamically determine the event detection and message delivery capabilities of the other party's AC, and finally, dynamically register for the desired events (and messages).

Preemptive services could possibly be realized through two approaches. First, preemptive services only applied within closed pre-defined customer groups, e.g., a Centrex business group. Customers within the group (i.e., the services, ISC, and AC-ASM functions provisioned for the customer) have given permission to allow the "foreign" service to impose, only if the foreign services are related to other group members. This implies that a hierarchy of permissions must be established. For example, in most cases, residential customers will not want to allow other residential customers to automatically impose services and likewise, business customers will not want to allow other business customers to automatically impose service capabilities which includes setting of events. On the other hand, within a business customer environment, or within a residential family, "higher order" users (e.g., a department manager or a parent) may have permission to impose service functionality on other subordinate users (customers). A hierarchy of ISCs could facilitate a hierarchy of permissions for preemptive services applied across a well-defined group of customers.

A second approach to allow preemptive service relationships would be through a negotiation process that would enable the effected customer to confirm the veracity and grant appropriate authorization for the preemptive service request. For instance, a negotiated preemptive service that a calling party (originator) subscribes to may operate on a called party (terminator) AC in which certain event registrations had not been established a priori by the preemptive service for an in-bound association on the terminating end (represented by the called party AC-ASM). In this case, the called party (or an appropriate service) would need to authorize the calling party service to impose its controlling logic.

After each service has been provisioned for a customer, an ERL is generally in a static state. That is, until a new service is provisioned or an existing service changes the event registration profile, the ERL does not change. However there are multiple scenarios that dictate the need to dynamically change or augment the ERL. For example, a customer may self-order a new service that causes a provisioning and configuration action, a service (e.g., either provisioned or "preemptive") determines it needs additional event requests during service logic execution, or a $3^{rd}$ party monitoring service request for events that have not been pre-registered.

In order to support changes to an ERL, an AC provides the ability to negotiate the registration (or removal) of requested events by services, through the ISC (or ISC hierarchy in a closed user group scenario). The negotiation function would need to be supported by data access and change rights (security), policies that govern the ability for services to change events, interactive coordination with lower-level transport entities to validate support of event requests, and appropriate interfaces to back-office systems (inventory control, provisioning, performance and fault management).

Similar to the ERL, the AC must also maintain a Message Registration List (MRL) that is controlled by services through an interactive instructive exchange via the ISC. Likewise, the ASM inherits the MRL from the AC when it is created. Ultimately, it is messages that the ASM directs toward an ISC relative to the occurrence of a requested event or receives from an ISC for instructions and requests from services. Messages are the mechanism in which events and their related contextual information and service directing instructions are exchanged with an ISC, and subsequently, with the appropriate Service(s).

Messages comprise syntactical information elements of basic actions associated with distributed processing interaction (e.g., event handling by services, service intelligence directing action of subservient association control processing, etc.) and the related message payload that represents contextual information. Message primitives take the form of informational, request, or instructional action types, dependent on the purpose of the message exchange and the intended affect on another system entity. The contextual information is preestablished criteria of information elements that are included in the message that are requested by a service. Examples of contextual information include identification of an association control event, the unique identity of the entity of the event origination, any stale information of the related entities, attribute-value pairs (e.g., specified content of a Session Initiation Protocol message that invoked event), timestamps, software versions, and transport entity statistics (e.g., packet loss counts).

ACs provide the ability for services to determine the current messages supported by an AC. In the same way services may need to dynamically ascertain the ERL capabilities of an AC, MRL auto-discovery provides a complementary function for services to dynamically determine a MRL.

Dynamic modification of an AC's MRL by a service would be supported via a well-defined interface through the ISC. Again, as with the case of ERL modification, the MRL modification is supported through appropriate security, policy, and back-office system interfaces.

In addition to control of ASMs and management of ERLs and MRLs, the AC also facilitates the dispatching and receiving of messages to other system elements. ACs exchange messages with ASMs (for both configuration and control), ISCs (sending notifications, receipt of instructions and requests), and other ACs for the coordination of associations (both within and between administrative domains). While a Message Broker (MB) system entity of the architecture provides relaying, screening, and prioritization of messages between system entities, the AC must still provide intrinsic message communication capabilities.

In order to support the messaging requirements, the AC provides two key capabilities: incorporation of system entity naming schemes and messages profiling. These capabilities are essential for maintaining interoperability of the AC with other system entities. The AC is responsible for identifying the high-level, globally unique identity of the source and destination of a particular message. Whether the actual naming information is centralized or distributed, the AC provides the ability to incorporate any naming scheme into the dispatching of messages. Furthermore, the AC supports profiling of messages, which supports the definition of message primitives and related message payload. Message payload comprises event context information.

As was described above, ACs provide the management and coordination control of ASMs. Management of ASMs entail creation and deletion control through the identification, initialization, and modification of appropriate ASMs. Coordination capabilities provide relational context of relevant ASMs, as in the case of multi-party communications. In addition, the AC monitors and manages the high-level state (availability and capability) of the Transport functions (AP, TCAB, TC) it is related to via the TCC. This allows the AC to coordinate and control requests for the establishment, modification, and releasing of communication associations based on its knowledge of current availability and capability of association session processing and lower-level transport resources.

In addition to this high-level information from the Transport functions, the AC also monitors the ASMs it creates and subsequently deletes. Like the ISC, the high-level state values for ASMs might include: Idle, Setting Up Association, Association Established, and Releasing Association.

When an ASM completes the releasing of an association and returns to the Idle state, the AC deletes the ASM. This allows the AC to continue as the point-of-contact for future messages that may lead to creation of new associations.

ACs create an appropriate ASM in response to a message requesting a new association, e.g., a SIP (Session Initiation Protocol) VoIP "Invite" message results in the creation and initialization of a voice telephony oriented ASM. The AC configures the ASM with appropriate parameters, most important of which is the ERL and MRL. The ASM uses the ERL-MRL, along with other configuration information, to determine the types of events and corresponding messages it is expected to receive and produce based on the event notification requirements of interested services.

Services register their ERL, MRL, and state machine requirements when initially deployed, and perhaps dynamically during service execution. In order for the AC to provide the necessary ASM capabilities for registered services, it must make the determination if it can support the entire set of requested events, messages, and ASM capabilities during service registration. The AC may decide it can only support a subset of the required capabilities. This would result in an alert during the registration negotiation that a service is requesting non-supported capabilities. Then either a negotiation can occur between the service and AC to determine the working set of events, messages, and state machine constructs, or the service registration would fail and be reported to the provisioning function.

Furthermore, the ASM, like the AC, supports auto-discovery of ERL and MRL capabilities as well as the ability to dynamically modify or augment the availability of discrete events and messages from the base set of capabilities to services.

The AC coordinates and controls ASMs within its realm of authority, i.e., only those it has created. Hence, once an AC establishes the need for an ASM and creates the ASM, it must coordinate and control the ASM within the context of the expected service requirements. Specifically, control of ASMs involves high-level state monitoring, identification and validation of the appropriate ASM type with respect to the message requesting the establishment of an association, determination of whether or not transport and access resources will support the establishment of a given association request, and delivery of inter-AC messages to appropriate ASMs for the purposes of establishing, modifying, augmenting, and releasing of associations. Coordination of ASMs allows a single AC to orchestrate multiple ASMs on behalf of a customer to enable multiparty and multimedia services. For instance, a call waiting service would require that an AC simultaneously coordinate two ASMs, one for each party attempting to communicate with the represented party. This example could be extended to N-way communications, with N ASMs representing the communications between the respective party and the N participants.

In addition to the creation and configuration of ASMs, AC control functionality also includes any state initialization (state model input data), initialization of any state model parameters, and management of the deletion of an ASM.

Because ACs are dynamically related to Transport Connectivity Controllers (TCCs), which in turn relate to specific APs, TCABs, and TCs, the ACs and the ASMs that they control are defined with generic event and messaging capabilities that abstract the relevant Transport function capabilities. An AP-TCAB couple that supports VoIP telephony would require that the ASMs related to the controlling AC to generically support access and control functionality of the appropriate transport level VoIP requirements. For instance, ACs and ASMs are capable of generically registering for abstract transport level in-band events (e.g., "off-hook", dialed digits, packet counts, packet loss). The TCC would be the function that translates the AC-ASMs generic request to technology specific event and message registrations. For example, an AP-TCAB couple informs the AC on the state of the Access Portal, the number of current Transport Channels (either connected to an AP via the TCAB or pending connection), and the high level state (status) of each TC. The AC can also query, via Request Messages, the AP-TCAB to determine its capabilities (simultaneous channel capacity, bridging and mixing functions, bearer conversion-translation capabilities, etc.).

As described above, one ASM is created for each customer service set participating in an association. It embodies an association state machine that manages the conditional sequence of states related to service processing for originating, terminating, and modifying established associations between Service functions on behalf of customers for a specific type (data, voice, video) of communication. When a requested event occurs, the ASM delivers the appropriate notification message with requested context information (relevant to the state model in effect) to the ISC for distribution to the appropriate (prioritized) service(s).

In accordance with managing associations, the ASM embodies rich and powerful event detection capabilities, including mid-association (established association) events, de-coupling service logic from transport control. ASMs are created for specific types of media. That is, if a portal is designated for voice telephony then a voice telephony-oriented AC, and more importantly, a voice telephony ASM is created. If a portal is for data then a data-oriented AC and data ASM are created, and so on. The possibility exists, of a single, unified, rich and flexible state model that could be defined to support a wide range of communication services. If found to be desirable, it would eliminate the need for specific ASMs for each type of media and simplify the architecture and provide greater communication media convergence. The approach described herein does not require this unified state model, but could accommodate and support it if one were developed.

A finite state machine that represents the logical state sequences of service processing for the association, criteria that drives discrete state transitions, the input and output parameterization of data for each logical state, and global state parameters are examples of state model constructs. The state model constructs provide logical representation of association session processing that allows service logic to be applied at different states and for state transitions. For instance, the logical states of the state model could represent the authorization of parties, collection of association related information, the establishment of an association endpoints and bearer paths(s), mid-association modifications, and the subsequent releasing of some or all of the association endpoints and Transport resources.

The transition between states of the state model may be driven from both internal and external stimuli. Internal stimuli could be counters, timers, or changes to global parameters. On the other hand, external stimuli could be messages from other system entities or event notifications from transport level resources (e.g., detection of a pre-specified packet count on an AP-TCAB). Either transition between states or state-internal actions could generate a requested event that would result in the generation of a message to the appropriate system entity (e.g., AC or ISC), and ultimately a service.

In addition to the ASM having a state model representing the association processing requirements of respective services for specific types of media, an ASM can also represent the role the customer (and the respective services) is playing relative to an association. Three key roles an ASM can be involved within an association are originating (ASM's customer initiated the association), terminating (ASM's customer is the requested destination of an association), or intermediate (ASM's customer is a proxy or relay point for an association). The ASM provides the ability for a customer to play any of these three roles. Furthermore, through AC coordination capabilities, a customer could possibly play all three roles simultaneously across multiple associations, by controlling multiple ASMs, each playing a distinct role within a given association. It is the controlling AC that maintains the relational state knowledge of an ASM's role relative to originating, terminating, or intermediate status.

The basic relationship between Services, ISCs 200, ACs 202, ASMs 204, Transport Connectivity Controllers (TCCs) 207, Access Portals (AP) 208, Transport Channel Access Bridges (TCAB) 211, and Transport Channels (TC) 210 is illustrated in FIG. 9. Three ASMs 204 are shown, each managing separate associations at different points of connectivity control (i.e., within the Transport function, from top to bottom are the representations of an established bearer path, pending bearer path, and null bearer path). From the ASM's perspective, each association is related to the services (peer-to-pear or client-server) providing communication capabilities for customers, and subsequently the bearer connectivity provided by TCC control. In turn, TCC's 207 control it's related Access Portal 208, TCAB 211, and Transport Channel 210 objects once the association has been established and the transfer of media is needed. The ASM indirectly manages each of these Transport objects on behalf of its AC (which is directed by a Service object) through the TCC system entity.

The TCC directly controls (manages) the communication transport resources for services (via messaging through the Association Controllers and ASMs) on the behalf of customers. The TCC manages the details of controlling technology-specific transport (bearer) routing, switching, inter-office facilities, etc. functionally modeled as APs, TCABs, and TCs. One TCC is mapped to each AP and therefore a hierarchy of APs (e.g., in the case of DSL with software defined sub-ports, such as a derived telephony loop) is reflected by a hierarchy of TCCs. Each TCC may map to one or more ACs (e.g., allowing ACs, and in turn, services to share portals) and conversely, each AC may map to one or more TCCs (e.g., to support "hunt" group like functions or multi-line ringing scenarios). The TCC also manages the corresponding TCAB and the one or more TCs (for the one or more associations) related to the AP at any moment in time.

TCCs provide connectivity management for multimedia and N-way (2-way or multi-party) connectivity by facilitating the control of APs and TCABs and the creation, modification, and deletion of TCs. This capability of the TCC provides the mechanisms to regulate the media flow and control the connectivity of the association by connecting, releasing, queuing, transferring, redirecting, mixing, and multiplexing TCs relative to the AP and TCAB under it's control. The TCC connectivity management may be applied to pending associations (in setup or release stages) as well as stable associations. For each TC handled at the TCAB, a corresponding ASM (originating, terminating, or intermediate) is active and processing the related association. For multimedia and multi-party scenarios, a service has reference to each of the relative ASMs for an aggregated view of the association state, while the TCC provides the connectivity view, both under the control of the service.

The Transport Layer provides the bearer media transport through abstracted channel, bridge, and access portal functions. In the physical sense, these functions are built with basic switching and cross-connecting; cell, frame, packet and circuit switching; forwarding/routing; traffic policing and shaping; and underlying transmission resources. Services and control functions in layers above "know" the media type of each transport function (i.e., access portal, bridge, and channel) and as such like functions are mapped to one another.

Access Portals carry the "bearer" or "media content" across a domain boundary from one domain to another. They are a functional representation of the media transport—not a physical one. Each access path (i.e., wireline, wireless channel, DSL channel, T1 channel, ATM PVC, etc.) in or out of either side of a domain (e.g., customer terminating line or inter-exchange carrier trunk facility) is modeled as an Access Portal (AP). On the network "access side"—also called the "local loop," or the "last mile," or "terminating lines"—all types of access between the customer's network/device(s) and the shared metro network are modeled as Access Portals.

Each AP represents (and can communicate to other objects) the characteristics of that portal including, for example, its physical transport capacity, its current capacity utilization, the media formats it supports (including built in CODECs or format converters), etc. It also embodies a simple state machine for transport "flow" (either a "circuit connection" at an electrical level, or a packet flow). Access Portals can detect and respond to "low-level" events such as "packet present," "no packets for xx seconds/minutes," "off-hook," "on-hook," "current packet throughput is xx," etc.

The use of policy management can be enabled for the AP (as well as other Transport Layer entities) in order to control attributes, such as resource utilization. For example, allowable burst rates across a data AP or the number of simultaneous channels that a TCAB allows. These policies could be set by a service or a provisioning function and could be dynamically modified to meet customer needs. For instance, a service customized for a customer would have a service-specific resource utilization profile that restricts the use of transport resources. Policy applied to Transport functions enables flexibility in service offerings, e.g., dynamic billing arrangements that allow a customer's services to instantaneously consume more transport resources as the customer demands change.

Access Portals support a hierarchy of TCCs to reflect the functional use of the physical media they represent. For example, a channelized DS-1 business line is mapped to one TCC for the DS-1 line and multiple TCCs for each of the up to 24 DS-0 channels within. Similarly, a DSL transport connection on a copper access line, has one TCC for the DSL data capability and a separate TCC for the baseband voice circuit. In addition, within the DSL TCC, separate TCCs may exist for each derived voice channel, if any, and for the data channel. In turn, within the data channel, if the customer subscribes to specific data services (e.g., Instant Messaging, URL Screening, etc.) integrated by their ISC in that domain then additional TCCs would exist (and additional ACs) for each data service and association. On the other hand, if the customer subscribes to Instant Messaging and URL Screening from some other service provider (in another domain) then separate TCCs would not exist for those services, nor would specific ACs, in this domain. In this later case, all data flows over the DSL data channel would be treated as generic data associations.

Transport Channel Access Bridges (TCABs) bridge together an Access Portal with one or more Transport Channels to create the "bearer" content flow of associations. Each Access Portal relates to one and only one TCAB at any moment, as illustrated in FIG. 9. The mapping of AP to TCAB could be dynamic in order to allow for APs to bind to TCABs that provide the necessary bridging capabilities. The TCAB may facilitate 1-Way, 2-Way, or N-Way connectivity for an Access Portal. As a bridge it can facilitate the amalgamation of two or more associations (from a services perspective) by merging two or more channels together with a single Access Portal. In addition to maintaining connectivity for established associations, the TCAB provides transport level event detection and responses to auditing of capability constraints (by higher layer objects) through related message delivery to the controlling TCC. For instance, the TCAB maintains configuration parameters that govern the number of simultaneous connected channels. Access Portals on both "sides" of a domain have one and only one related TCAB. TCABs also support one or more Service Transport Channels (STCs).

TCABs can be of either two types, Simple Bridges and Multi-Way Bridges. Simple bridges (TCABs) support most communication associations and services. Connecting an Access Portal and one Transport Channel, simple bridges enable 2-Way and 1-Way associations—everything from basic 2-Way voice calls (whether packet or circuit) to Instant Messaging, and from broadband dedicated channels to Internet Web browsing.

Multi-Way Bridge functions support all other enhanced N-Way communications. The TCAB performs this function by either joining together two or more Transport Channels or multiplexing between them. Joined associations form conferences where all end-points share the same bearer media content. Multiplexed associations support services like Call Waiting, which could be enhanced to support more than two parallel calls (and the related associations), especially over a packet network. In addition, the TCAB can functionally support temporary private associations between two access portals in the midst of a multi-party (portal) conference. Sometimes called a whisper capability, the TCAB could, upon command from a service, unbridle two or more channels from the broader conference bridge and reconnect those channels in their own private whispered side "conversation." Of course, the media could be anything from voice to data to audio transported over circuits or packets.

The primary purpose of TCABs is to bridge together one or more Transport Channels with the Access Portal the TCAB serves for the customer. In addition, the TCAB provides a very important capability to service objects by connecting Service Transport Channels, (STCs) into the primary customer channel(s). As described below, these STCs either terminate the connection to one "end-point" of the association or another, or they allow a service to connect in the middle of the connection path. The primary purpose of a TCAB supporting a STC connection is for media processing services to process media flow content over established bearer paths (e.g., to provide codec conversions or provide Digital Signal Processing functions on the media flow). Service Transport Channels have the same properties and capabilities as Media Transport Channels except for the fact that STCs "know" about MTCs, but MTCs do not know about STCs.

Transport Channels (TCs) carry the "bearer" or "media content" between two or more points in the communication network. Here, "bearer" path can be either connection-oriented (e.g., ATM VC) or connectionless (e.g., IP UDP stream). They are a functional representation of the media transport—not a physical one. In comparison, system messages (signals) are carried over a different, functionally separate infrastructure (except where legacy analog Access Portals exist to support POTS devices).

This invention defines two types of TCs. The first, Transport Channels (TCs) represents the bearer path between two TCABs and their associated Access Portals. Each end of the Transport Channel connects to one and only one TCAB-AP, whether that be two TCAB-APs or one side of a domain (e.g., the customer network side) or one TCAB-AP on the customer network side and the other on the Inter-Network side (as in a PSTN "trunk" circuit or packet router "trunk"). Second, Service Transport Channels (STCs) carry the bearer media content from an Access Portal-Bridge (AP-TCAB) to a service. STCs serve two purposes. At either end of an association they terminate the bearer path from an Access Portal-Bridge (AP-TCAB) to a service, and in the middle of an association they allow a service object to monitor and/or modify or augment the media content carried through the end-to-end TC. Services like Voice Dialing or 3-Way/N-Way VoIP Call that support mid-call events, or URL screening that filters all Web packets use STCs. Examples of terminating STCs include the bearer flow from a customer's Access Portal to their communication device, or in a network from a TCAB to Voice Messaging server, Web page server, or any IVR server.

Similar to Access Portals, all TCs support very basic state models for transport "flow". Transport Channels can detect and respond to "low-level" events such as "packet present," "no packets for xx seconds/minutes," "off-hook," "on-hook," "current packet throughput is xx," etc. Unlike TCCs, however, TCs are not hierarchical. Any relationship between multiple TCs is managed by individual services through the two or more ASMs managing the associations that the TCs are part of. This also applies to multi-cast or broadcast services that direct (correlate) multiple ASMs and in turn multiple TCs.

Each of the Transport Channel types abstracts the physical network implementation details of transport switching, routing, trunking, optical rings, transmission, etc., from Transport Control. The Transport Channel functionality is responsible for managing all of these physical network specifics. It must also be able to represent and report its transport capabilities (including capacity) and characteristics (e.g., current bandwidth usage) in response to requests from other objects. In addition, TCs, like Access Portals and TCABs, must support a basic set of events and associated messages.

Figure 7:
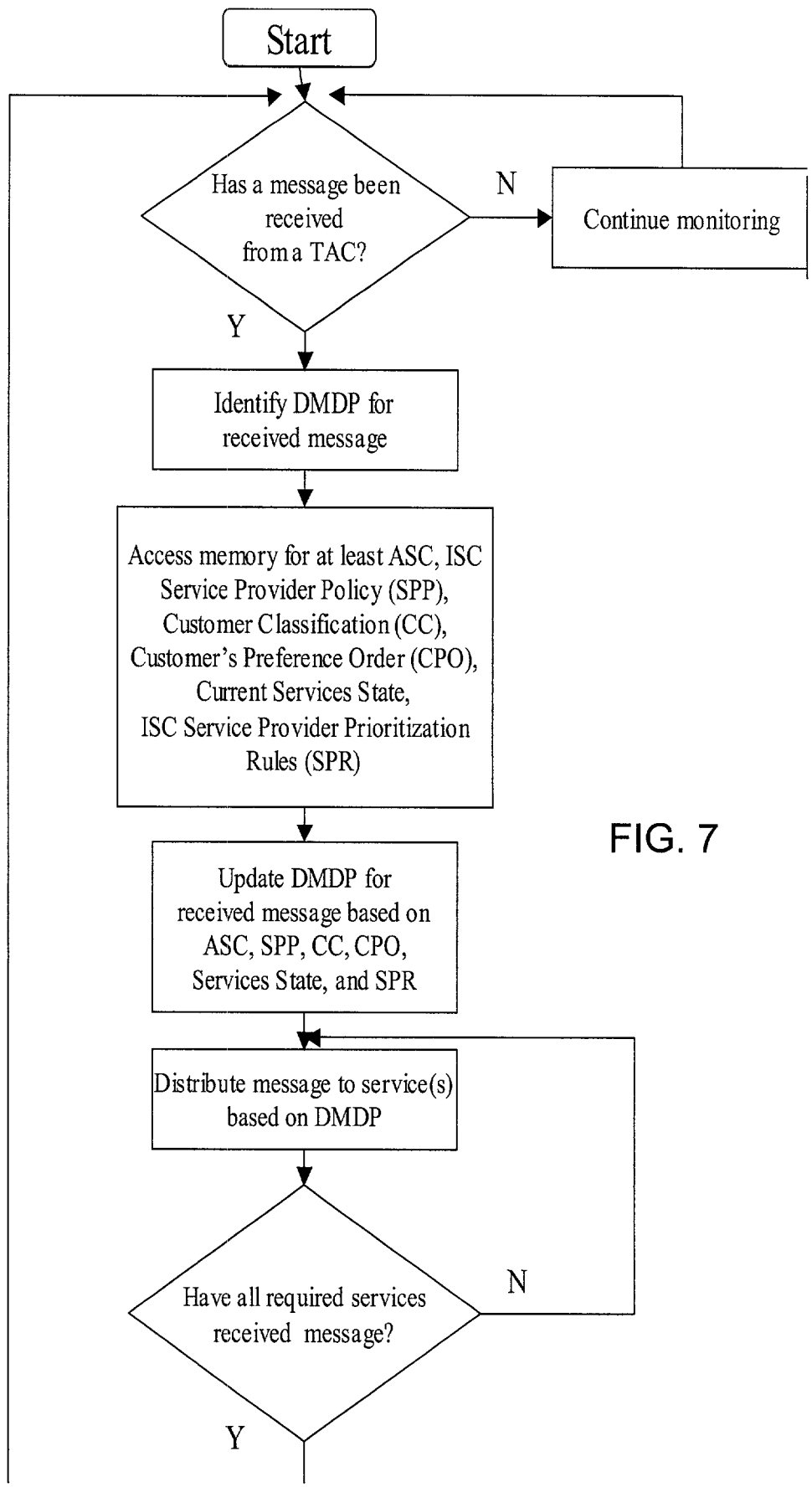
FIG. 7 discloses a flowchart which describes in detail the steps performed by the Integrated Service Controller in response to a message from a detected event at an access portal.

The processes performed by the ISC in responses to a detected event at an AP are disclosed in the flowchart of FIG. 7. Upon receipt of a message from the TAC or other system entity, the ISC instantly updates the Dynamic Message Distribution Prioritization (DMDP) for that message. The instant update includes any possible recent changes to the customer's classification, the customer's service order preferences, the current state of all services, any other classification criteria, and is processed using the intelligent prioritization rules built within the ISC. The resulting DMDP—at that moment—is used by the ISC to dispatch the message on to the appropriate service, and depending on the situation, to possibly wait for a reply. When reply messages are received from a communication service they are processed accordingly. The ISC may be further configured to retransmit the message to the communication service if a reply message is not received within a particular period of time. The ISC is configured to receive multiple types of reply messages from a specific service. In addition to "service completed successfully," or "service aborted with an error," a service might also return a "pass" reply. This indicates to the ISC that the service did not perform any functions (e.g. it was "off" at the time) and the ISC should determine if the message should be distributed to the next service in the DMDP. Of course, many other types of reply messages are anticipated by the inventors. Fault and performance management messages may also be logged in this case.

Through inter-domain service control and inter-working module 64 communications with multiple service providers over multiple domains may be accommodated. As was mentioned above, each customer, or person in a customer group, has an ISC. Because, however, this invention supports multiple service providers, a customer might purchase services from more than one service provider, where each service provider might deploy services in more than one domain. In addition, distributed intelligence requirements may also dictate that multiple ISCs within a single provider domain must interoperate, where each ISC has the ability to establish inter-working relationships with other appropriate ISCs. To accommodate distributed service control entities that in turn can support multiple services, in multiple (or single) domains, possibly from multiple service providers, either one ISC is established as the Master ISC, or multiple ISCs may inter-work as peers. The degree of integration between ISCs—that is, the commands (instruct messages) allowed to other services and other ISCs in other domains—is directly related to the degree of trust the Master ISC has for the other ISCs and the other services. ISCs that do not inter-operate with other ISCs are considered standalone ISCs.

With a Master ISC inter-working with Remote ISCs in other domains, the customer receives a degree of integration of multiple services across domains. In this scenario, messages are delivered to services across multiple domains based on a single DMDP for each message in the Master ISC. To support this type of distributed and integrated service control each customer must establish a Primary Service Provider (PSP) and Other Service Provider(s) OSP(s)—whether selected explicitly by the customer (similar to choosing a long distance phone provider today) or determined automatically by the system. Their Master ISC is always provided by the PSP, whether that is the local incumbent local exchange carrier (ILEC) (in a local/metro network) or a competitive local exchange carrier (CLEC) located in another domain. Other ISCs are provided by the one or more OSPs for a customer. The Master ISC inter-works with the one or more OSP ISC(s) through a special message interface.

For example, suppose a customer receives basic 2-Way Voice Calling, Priority Call Waiting, and Dynamic DSL from their "local" network provider (who also provides as the PSP the customer's Master ISC.) and Instant Message Deluxe, Web URL Screening, and Video-Multimedia Family Gathering (a video conferencing service) from an OSP. The first three services would register with the Master ISC in the PSP's domain. The last three services would register in one of two ways. First they would register with the Other ISC in the OSP's domain and in turn, the Other ISC would re-register each service with the Master ISC over a secured inter-domain interface. Alternately, the last three services in the OSP's domain could register directly with the Master ISC over a secured inter-domain interface. In either case, the Master ISC maintains the primary registration for all services, regardless of domain and service provider. Depending on the degree of trust the ISP places in each of the one or more OSPs, the Master ISC may restrict, including disallow, specific messages to and from services provided by an OSP in another domain.

This method establishes the Master ISC as the initial and master control of intelligent multi-service message prioritization. Because the customer can equally choose any service provider as their PSP this creates a level competitive playing field and also allows new service providers to dynamically deliver new services to any customer.

Alternately, Peer ISCs (e.g. an ISC in a customer network and an ISC in an ILEC network, or an ISC in an ILEC network and one or more ISCs in other OSP networks) may collaborate and exchange some messages, however, each ISC maintains its own registration of services within its domain and its own DMDP for each registered message. As such, some services may "collide" as they compete for un-mediated, un-integrated transport resources including discrete event notifications. Other services may co-exist harmoniously, but the key deficiency in this case is that with Peer ISCs services across domains are not integrated. In this situation, the customer has chosen Multiple Service Providers (MSPs) which operate as peers without ISCs designated as Masters or Remotes.

Customer groups (e.g. a business or a family) have a hierarchy of ISCs where each "child" ISC can inherit profile attributes and permissions from the "parent" ISC. Moreover, all operations data (e.g. provisioning, accounting, and billing, . . . ) is either done at the parent ISC level or for each child ISC, or both. The system described herein may also support Remote Users, that is, customers who travel to a domain other than their "home domain," and still have access to a significant part (if not all) of their subscribed (purchased) services.

Operations Aspects of Service Control, module 58 in FIG. 3, provides for communications between the ISC and various operational management functions. This includes interfaces to most, if not, all of the traditional Operations Process Areas (Capacity Provisioning, Service Delivery and Service Assurance) and Telecommunications Management Network (TMN) Functional Areas (Fault Management, Configuration Management, Account Management, Performance Management and Security Management—collectively known as the FCAPS functions).

Figure 8:
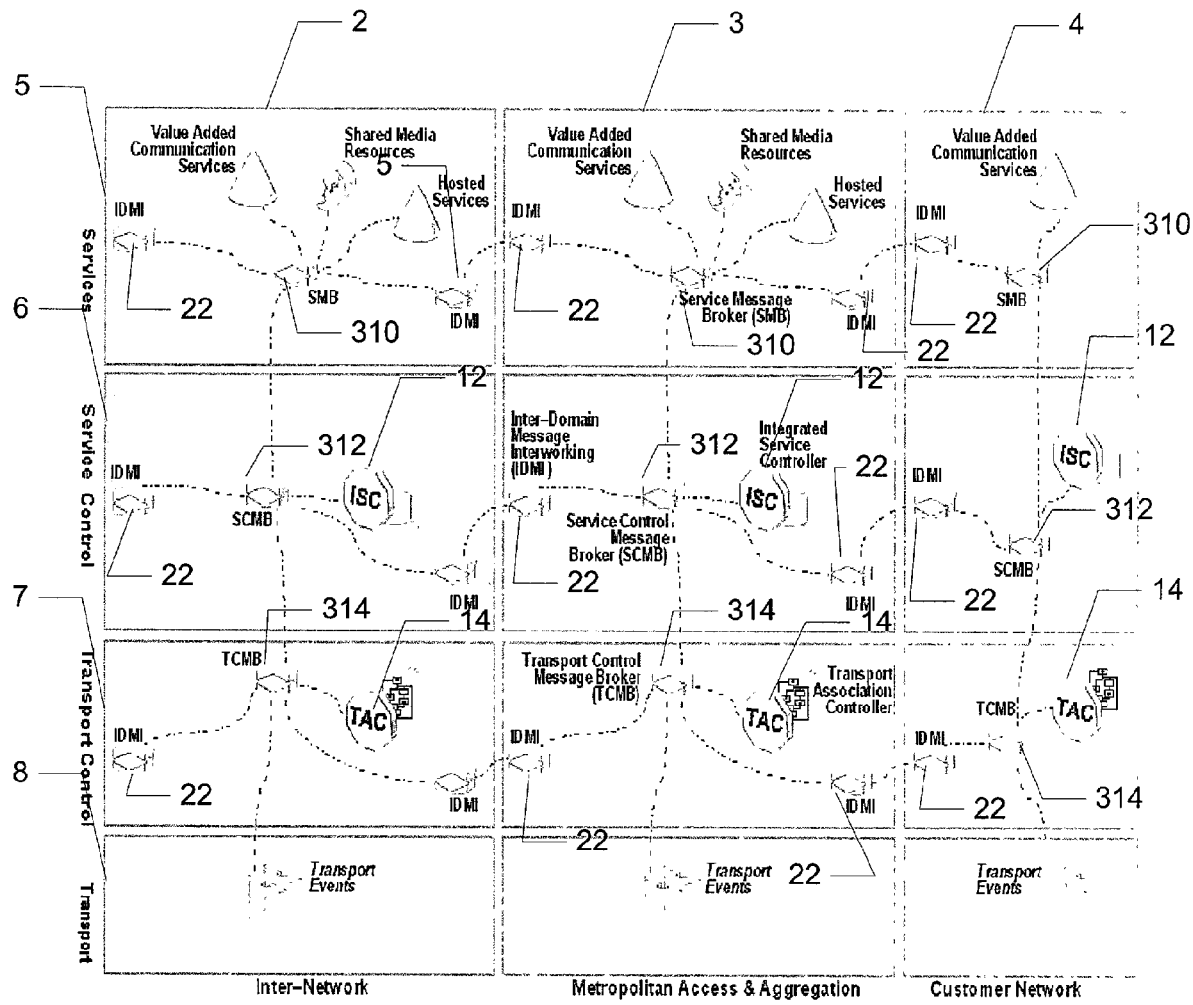
FIG. 8 discloses a system diagram for a service control functional architecture which employs distributed message brokers.

Disclosed in FIG. 8 is a diagram that illustrates the message broker capability for the communications systems 10 described above in FIG. 1. On a general level it is seen that each layer within a domain of the architecture includes at least one distributed message broker (DMB) 312-314. In the configuration shown in FIG. 8, the primary purpose of the DMBs are to relay and screen messages based on prioritization schemes in support of message exchange between the different layers and domains. The relaying and screening of messages may be based on prioritization rules of a customer classification (relative ratings of customer attributes, e.g., Platinum, Gold, Silver, Bronze), associated service classification (relative ratings of service attributes), and system entity classification (relative ratings of system entity attributes) applied to a message classification of messages between system entities.

The DMB may be characterized as functionality that supports distribution and common messaging capabilities in a manner that is independent of underlying infrastructure (e.g., programming languages, platform OS, communication protocols) to the fullest extent possible. Examples of distribution capabilities include transparently invoking methods and delivery of event notifications to named objects, i.e., system entities, whereas examples of common capabilities include configurability of message-Quality of Service (QoS) as related to message distribution prioritization.

Within the system 10, DMBs play two primary roles. The first role is to relay and screen messages based on prioritization rules for intra-domain message exchange, both within a specific Functional layer (e.g., service layer) and across vertically adjacent layers. Within a layer, the DMB is supporting distributed object communications. Across adjacent layers, the DMB is supporting message exchange with complementary messaging capabilities to fulfill event distribution amongst related system entity objects (e.g., between Service Directors and an ISC).

The second role the DMB plays is in inter-domain message exchange. Here, the DMB, referred to as an IDMI (Inter-Domain Message Inter-working) function, provides additional security., translation, object reachability, and non-repudiation capabilities that are essential for inter-provider object communications. It is assumed, from a functional perspective, that system entity objects will have high-level name and inter-object relationship knowledge that allows them to generically specify message destination.

DMB capabilities are fundamental messaging facilities required to support the distinct and systematic service framework that realizes higher degrees of vendor independence, service plug 'n' play, and service integration. While the generality of DMB allows reuse of generic capabilities, each of the functional layers in the architecture model also requires specific DMB capabilities as will be described below. To clarify the significance of a functional definition, the distributed messaging capabilities described herein will likely involve both client-server and peer-to-peer implementations. Thus, aspects of the defined capabilities may be realized in both the messaging end-points as well as messaging distribution points.

Referring again to FIG. 8, DMB functionality exists at each layer (5-7) of the communications system 10. The system diagram shows the logical relationship between DMBs and the system entities they support. As shown, DMBs 310-314 generally provide message relay within a layer and across adjacent vertical layers to complementary DMBs. Message relay may further occur with Transport Association Controllers (TAC), Association State Managers (ASM), an Integrated Service Controller (ISC), a Service Director (logic) entity, and service management entities (fault, configuration, accounting, performance, and security systems). Message exchange across domain boundaries utilizes the Inter-Domain Message Interworking (IDMI) DMB 22 which includes additional security and inter provider scope functionality.

Generally speaking, the DMBs enable a generic and reusable infrastructure that enables service objects to exchange messages and associated data. Message types can take the form of a request, information (e.g., responses to requests or notification "pushes"), or instruction (e.g., registration or commands). Key attributes are broken into two primary areas, distribution and common capabilities.

DMBs, at the simplest level, are functions that relay and screen messages (based on prioritization rules) between primary system entities. Message relay involves directing a message to the appropriate destination based on the high-level name provided in the message by the system entity object. Screening of message types—not message content—allows for the establishment of global policies that inhibit or flag (i.e., set an alarm) the relaying of particular messages. Screening may involve simple checks on the origination-destination name pair, or can be more complex and involve message security keys (e.g., digital certificates). Prioritization of message delivery can be static based on prioritization rules based on customer, service, and system entity classifications as well as operator policies or augmented by dynamic prioritization schemes.

DMBs instill the notion of message-QoS by allowing the specification of message delivery parameters that affect predictability and responsiveness. The message delivery parameters may affect the manner of delivery for messages of a particular classification of messages between identified origination-destination endpoints, such as various system entities. Message-QoS parameters may include timers, queuing priority order, levels of message delivery guarantees (control acknowledgement semantics), ordering of sequential messages, integrity of message delivery, and message duplication handling. In turn, the DMB realizes message-QoS via abstraction of resource control of physical elements (e.g., processing, communication, and memory).

The DMBs may be further configured to perform the message relay and screening prioritization of the messages of a message classification based on static message operation prioritization rules. The static message operation prioritization rules may comprise security policies, resource allocation arbitration, reactivity to communication network conditions to ensure performance levels, and relationship definitions of associated messaging endpoints. The DMB intelligently applies the static operation prioritization rules, along with the associated customer classification, service classification, and system entity classification prioritization against a message classification (e.g., message type and associated event information) through the application of the respective message-QoS for the message classification. This helps ensure that the respective system entity object messages receive the requisite message-QoS delivery guarantees.

The DMBs may further perform dynamic message delivery prioritization which augments the static message prioritization capabilities. Dynamic message prioritization is performed for message relay and screening of the messages of a message classification through communication with the system entities from which the one or more messages is generated or received. Dynamic prioritization allows system entity objects to delineate and negotiate message-QoS requirements relative to message delivery. Dynamic prioritization may only be applied to pre-specified classes of messages and can be overridden by static prioritization policies.

The DMB may still further support object discovery and object location transparency. Discovery allows a serving object to advertise capabilities and a client object to identify and obtain a reference to the server object methods. Transparency enables objects to easily communicate without requiring an object to know the addressable reference for every object in the relevant networks. Here, name resolution is used to resolve a name to an addressable reference. Naming conventions provide for interoperability and name-to-object interface resolution.

Message distribution modes for both sending and receiving messages by the DMB include unicast, multicast, and broadcast methods to support various messaging requirements. In support of sending multicast and broadcast messages, the DMB specifies the identity of the responding objects as well as ordering of the response messages based on prioritization. Some DMBs may likely be restricted to a unicast model to reduce complexity and enforce object functionality, e.g., a transport control DMB may be restricted to send TAC-ASM events toward a single integrated service control object.

Configurability of the DMB relative to back office Management functions allows a mechanism in which the DMB policies can be defined and modified. Examples of configurable policies include message classification defined on an extensible set of parameters and the mapping of message-QoS bounds to the message classifications based on prioritization rules. Examples of message classification parameters include message type (i.e., request, information, and instruction), associated event in message payload, or support of connection or connectionless oriented message transactions, etc.

Security aspects of the DMB relate to a system entity's right to transmit messages (identification and authentication) as well as authorization to access the target system entity. Also relevant is protection of the integrity and confidentiality of the message contents. It may be optional to apply security constraints on a DMB that is purely relaying messages within a trusted domain.

Each of the DMBs may be locatable in the various communications planes and domains shown in FIG. 8, and depending on that location, will include some additional capabilities. The Service Message Broker (SMB) 310 subsumes the general DMB capabilities described above, and adds some additional capabilities specific to the service layer 5. Specifically, the SMB will also need to enable message-QoS with respect to relaying messages through different Service Control Message Brokers (SCMB), the SMB 310 will also need to support message exchanges within the Service layer, and support of message exchange to specific operating planes.

SMBs 310 will likely need to exchange messages with multiple Service Control Message Brokers (SCMB) 312. For cases where a SMB has one-to-many links to SCMBs, the SMB will need to choose the appropriate SCMB when that relay decision may impact specified message-QoS.

For instance, if a message class requires a high level of message-QoS, then the SMB may need to choose the SCMB that can meet the specified message-QoS. While the SMB will be primarily concerned with exchanging messages between services and ISCs, there will also be the need for the SMB to provide other messaging relay capabilities. This implies that the SMB discriminates between messages associated with the service-to-service control layer interface versus service-to-other components in order to ensure appropriate message-QoS treatments are applied accordingly. Other component messages include intra-service object messages between partitioned service components (e.g., customer command and control messages to a network-based interactive service), or intra-service configuration messages (e.g., customer parameter adjustments). The SMB may also need to screen (allow or disallow) specific intra-service messages-based on type, classification, QoS, or any other parameter—to support appropriate message flow through the appropriate ISC in the Service Control layer.

Message exchange between the Service layer and operations functions may also utilize the SMB. These messages include intra-service configuration, service inventory, service management, and service provisioning interfaces. The SMB provides interfaces to these back-plane functions to support the necessary customer self-configuration and back-office capabilities.

The SCMB 312 subsumes the general DMB capabilities described above and adds some additional capabilities specific to the Service Control layer. The additional capabilities described here are the SCMBs ability to support message-QoS with respect to relaying messages through different SMBs and Transport Control Message Brokers (TCMB) 314, ISC-specific screening in support of inter-domain and distributed service control, and support of message exchange to specific operating planes.

By their definition, ISCs will need to exchange messages with distributed Service Directors and Transport Association Control objects. It may also be the case that multiple SMBs and TCMBs could be used for the identical message exchanged to/from an ISC. For cases where a TCMB has one-to-many links to SMBs or TCMBs, the SCMB will need to choose the appropriate SMB or TCMB to ensure message-QoS is maintained.

Remote users are defined as customers accessing and using home domain services from a remote domain. Consequently, if a remote or proxy ISC is utilized, then the SCMB will need to provide additional screening that is not done by the IDMI broker 7. Additional screening may involve the local ISC specifying under what conditions it will receive remote/proxy ISC messages.

Message exchange between the Service Control layer and operations functions may also utilize the SCMB. Messaging between the ISC and other planes includes customer access to modification of integrated profiles, ISC management, service control inventory, and service control provisioning interfaces.

The TCMB 314 subsumes the general DMB capabilities and adds some additional capabilities specific to the Transport Control layer 7. Specific capabilities of the TCMB include support of message-QoS with respect to relaying messages through different SCMBs, the ability to interwork prevalent signaling protocols, the ability to translate Transport layer events into TAC events, and the support of message exchange to specific operating planes. For cases where a TCMB has one-to-many links to SCMBs, the TCMB will need to choose the appropriate SCMB to maintain message-QoS.

Message exchange between the Transport Control layer and operations functions may also utilize the TCMB for TAC management, transport control inventory, and transport control provisioning interfaces.

The IDMI broker 7 subsumes the general DMB capabilities and adds some additional capabilities that span all four layers of the system 10. The IDMI broker enables message distribution across domain boundaries and possibly within a domain whenever messaging between providers is required. The IDMI broker will provide advertisement functions for system entities across provider domains via a schema that specifies object properties, such as ownership, licensing, methods, and parameters. The schema essentially provides partial views of objects from a remote domain perspective. The IDMI broker is responsible for authentication and authorization of objects involved in inter-provider domain exchanges as well as support of non-repudiation capabilities.

Scenarios may exist where messaging across domains requires additional message translation or tunneling. IDMI brokers may provide message translation or tunneling between remote system entity objects. Translation schemas would be defined in an extensible manner and applied to known translation scenarios. The message translation schemes employed by the IDMI broker are modular and configurable from a provisioning management system. In the event that translation capabilities are non-existent, then tunneling may be supported, provided that the objects in question agree to a common message protocol. Tunneling may be used for service object specific messaging requirements while translation may be used for inter-working of disparate message infrastructures.

To facilitate inter-domain message exchange, object reachability information will need to be shared in a secure and trusted manner. Policy enforcement can be used to provide rules on exchange of reachability information based on domain classification (authentication and authorization). In addition to proper security, the IDMI brokers may also provide either proxy or direct access to addressable objects. Direct access may only be used when appropriate security measures are in place.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A system for providing integrated control of at least one transport resource provided by at least one communication network service provider comprising:
   at least one Association Controller (AC) connectable to a plurality of communications networks so as to communicate with system entities, wherein the at least one AC dynamically receives an event registration list (ERL), which includes at least one event, through an interactive exchange of one or more commands with an integrated services controller (ISC) associated with the at least one AC, registering one or more events from the one or more communication services which have a notification interest in said events;

wherein the at least one AC dynamically receives a corresponding message registration list (MRL) through an interactive exchange with the associated at least one ISC, wherein messages described in the MRL relate to handling of the at least one event, where the messages comprise: message primitives and at least one related message payload information element which further comprises requested event context criteria.

2. The system of claim 1 wherein the message primitives comprise at least one of: informational, request and instructional action types each of which is dependent on a purpose associated with handling of the at least one event, wherein the purpose includes at least one of: control, coordination, and negotiation with other at least one system entities.

3. The system of claim 1 wherein the event context criteria comprises at least one of: identification of system entities, system entity state information, event attributes, and event attribute values.

4. The system of claim 1 wherein the at least one ISC dynamically receives a MRL through an interactive exchange with the at least one system entity of at least one message, wherein the at least one message includes the at least one related message payload information element.

5. The system of claim 1 wherein the at least one AC provides message dispatching to facilitate sending and receiving of messages to the at least one other system entity in order to coordinate communication transport association control.

6. The system of claim 5 wherein the at least one AC is further operative to provide auto-discovery of the messages that can be delivered to the at least one ISC on behalf of at least one service logic entity.

7. The system of claim 6 wherein the at least one AC is further operative to dynamically modify the MRL through negotiation of registration of the messages with the at least one ISC on behalf of at least one service logic entity.

8. The system of claim 5 wherein the system entities include:
at least one other AC, at least one association state manager (ASM), a message broker (MB), an integrated service controller (ISC), at least one transport connectivity controller (TCC), and one or more of the at least one service logic entities.

9. The system of claim 8 wherein the at least one AC performs at least one of: configuration, control and coordination of the at least one ASM.

10. The system of claim 9 wherein the at least one ASM applies all or part of the ERL relative to the communication association state criteria the at least one ASM manages.

11. The system of claim 9 wherein the at least one ASM is further operative to provide auto-discovery of the messages that can be delivered to the at least one AC on behalf of the at least one service logic entity.

12. The system of claim 11 wherein the at least one ASM is further operative to dynamically modify the MRL through negotiation of registration of the at least one message with the at least one AC on behalf of the at least one service logic entity.

13. The system of claim 9 wherein the at least one AC coordination of the at least one ASM comprises at least one of: high level event monitoring, event validation, and coordination of the modification, augmentation, and releasing of communication association requests on behalf of at least one directing service logic entity.

14. The system of claim 9 wherein the at least one AC control of the at least one ASM comprises establishing an appropriate ASM based on state criteria requirements and transferring at least one MRL registration, state initialization, parameter initialization, deconstruction, and high-level state management for said at least one ASM.

15. The system of claim 9 wherein an ASM embodies a state model that manages communication association state criteria and is operative to process received notifications of the events and generate the messages as a result of internal events that are sent to the at least one other system entity.

16. The system of claim 15 wherein the at least one ASM provides the mapping of messages received from the at least one other system entity or transport level events corresponding to at least one transport entity, to at least one registered event detection state of said state model.

17. The system of claim 16 wherein the at least one transport entity includes at least one of: access portal (AP), transport channel access bridge (TCAB), and transport channel (TC).

18. The system of claim 17 further including at least one TCC to communicate and manage the at least one transport entity through messaging exchanged with the at least one of: the at least one AC and the at least one ASM.

19. The system of claim 18 wherein each of the at least one TCC is each associated with one of: an access portal (AP), transport channel access bridge (TCAB), and transport (TC).

20. The system of claim 19 wherein the at least one TCC provides connectivity management for multimedia and N-way connectivity by facilitating control of the APs and TCABs and creation, modification, and deletion of transport channels.

21. The system of claim 18 wherein each of the TCC's map to one or more of the ACs.

22. The system of claim 15 wherein the ASM state model comprises at least one of: a logical state representing at least one point in communication association session processing and at least one associated event detection points, wherein the at least one associated detection points comprises at least one of: authorization, information collection, establishment, mid-association modification, and releasing of at least one communication association.

23. The system of claim 15 wherein the ASM state model provides concurrent representation of at least one of: an originating, terminating, and intermediate point of at least one communication association.

24. The system of claim 5 wherein the at least one AC provides for sending and receiving of the messages through use of a system entity naming identification scheme for the at least one system entity for the one or more of the events and messages registered to be received by the at least one service logic entity.

25. The system of claim 5 wherein the at least one AC provides for dynamic configuration of message profiles comprised of definitions of message primitives and event context criteria for support of interoperability of exchange of the messages with the at least one system entity.

26. A system for providing integrated control of at least one transport resource provided by at least one communication network service provider comprising:
at least one Association Controller (AC) that operates in a transport control layer and is connectable to a plurality of communications networks so as to communicate with system entities, wherein the at least one AC dynamically receives an event registration list (ERL), which includes at least one event, through an interactive exchange of one or more commands with an integrated services controller (ISC) associated with the at least one AC, registering one or more events from the one or more communication services which have a notification interest in said events;

wherein the at least one AC is further operative to provide auto-discovery of the at least one of the available discrete event notifications that can be delivered to the at least one ISC on behalf of at least one service logic entity.

27. The system of claim 26 wherein the at least one AC is further operative to dynamically augment or modify an ERL through negotiation of the registration of the at least one available discrete event with the at least one ISC on behalf of at least one service logic entity.

28. A method of providing integrated control of at least one transport resource provided by at least one communication network service provider comprising:

identifying at least one Association Controller (AC) which is connectable to a plurality of communications networks so as to communicate with system entities;

dynamically receiving at the at least one AC an event registration list (ERL), which includes at least one event, through an interactive exchange of one or more commands with an integrated services controller (ISC) associated with the at least one AC;

registering one or more events from the one or more communication services which have a notification interest in said events;

wherein the at least one AC dynamically receives a corresponding message registration list (MRL) through an interactive exchange with the associated at least one ISC, wherein messages described in the MRL relate to handling of the at least one event, where the messages comprise: message primitives and at least one related message payload information element which further comprises requested event context criteria.

29. The method of claim 28 wherein the message primitives comprise at least one of: informational, request and instructional action types each of which is dependent on a purpose associated with handling of the at least one event, wherein the purpose includes at least one of: control, coordination, and negotiation with other at least one system entities.

30. The method of claim 28 wherein the event context criteria comprises at least one of: identification of system entities, system entity state information, event attributes, and event attribute values.

31. The method of claim 28 wherein the at least one ISC dynamically receives a MRL through an interactive exchange with the at least one system entity of at least one message, wherein the at least one message includes the at least one related message payload information element.

32. The method of claim 28 wherein the at least one AC performs the step of message dispatching to facilitate sending and receiving of messages to the at least one other system entity in order to coordinate communication transport association control.

33. The method of claim 32 wherein the at least one AC is further operative to provide auto-discovery of the messages that can be delivered to the at least one ISC on behalf of at least one service logic entity.

34. The method of claim 33 wherein the at least one AC is further operative to dynamically modify the MRL through negotiation of registration of the messages with the at least one ISC on behalf of at least one service logic entity.

35. The method of claim 32 wherein the system entities include: at least one other AC, at least one association state manager (ASM), a message broker (MB), an integrated service controller (ISC), and one or more of the at least one service logic entities.

36. The method of claim 35 wherein the at least one AC performs at least one of: configuration, control and coordination of the at least one ASM.

37. The method of claim 36 wherein the at least one ASM applies all or part of the ERL relative to the communication association state criteria the at least one ASM manages.

38. The method of claim 36 wherein the at least one ASM is further operative to provide auto-discovery of the messages that can be delivered to the at least one AC on behalf of the at least one service logic entity.

39. The method of claim 38 wherein the at least one ASM is further operative to dynamically modify the MRL through negotiation of registration of the at least one message with the at least one AC on behalf of the at least one service logic entity.

40. The method of claim 36 wherein the at least one AC coordination of the at least one ASM comprises at least one of: high level event monitoring, event validation, and coordination of the modification, augmentation, and releasing of communication association requests on behalf of at least one directing service logic entity.

41. The method of claim 36 wherein the at least one AC control of the at least one ASM comprises establishing an appropriate ASM based on state criteria requirements and transferring at least one MRL registration, state initialization, parameter initialization, deconstruction, and high-level state management for said at least one ASM.

42. The method of claim 36 wherein an ASM embodies a state model that manages communication association state criteria and is operative to process received notifications of the events and generate the messages as a result of internal events that are sent to the at least one other system entity.

43. The method of claim 42 wherein the at least one ASM provides the mapping of messages received from the at least one other system entity or transport level events corresponding to at least one transport entity and to at least one registered event detection state of said state model.

44. The method of claim 43 further comprising the step of employing at least one TCC that communicates and manages the at least one transport entity through messaging exchanged with the at least one of: the at least one AC and the at least one ASM.

45. The method of claim 44 wherein each of the at least one TCCs is each associated with one of: an access portal (AP), transport channel access bridge (TCAB), and transport (TC).

46. The method of claim 45 wherein each of the at least one TCC's map to one or more of the ACs.

47. The method of claim 45 wherein the at least one TCC provides connectivity management for multimedia and N-way connectivity by facilitating control of the APs and TCABs and creation, modification, and deletion of transport channels.

48. The method of claim 43 wherein the at least one transport entity includes at least one of: access portal (AP), transport channel access bridge (TCAB), and transport channel (TC).

49. The method of claim 42 wherein the ASM state model comprises at least one of: a logical state representing at least one point in communication association session processing and at least one associated event detection points, wherein the at least one associated detection points comprise at least one of: authorization, information collection, establishment, mid-association modification, and releasing of at least one communication association.

50. The method of claim 42 wherein the ASM state model provides concurrent representation of at least one of: an originating, terminating, and intermediate point of at least one communication association.

51. The method of claim 32 wherein the at least one AC provides for sending and receiving of the messages through use of a system entity naming identification scheme for the at least one system entity for the one or more of the events and messages registered to be received by the at least one service logic entity.

52. The method of claim 32 wherein the at least one AC provides for dynamic configuration of message profiles comprised of definitions of message primitives and event context criteria for support of interoperability of exchange of the messages with the at least one system entity.

53. A method of providing integrated control of at least one transport resource provided by at least one communication network service provider comprising:

identifying at least one Association Controller (AC) which operates in a transport control layer and is connectable to a plurality of communications networks so as to communicate with system entities;

dynamically receiving at the at least one AC an event registration list (ERL), which includes at least one event, through an interactive exchange of one or more commands with an integrated services controller (ISC) associated with the at least one AC; and registering one or more events from the one or more communication services which have a notification interest in said events;

wherein the at least one AC is further operative to provide auto-discovery of the at least one of the available discrete event notifications that can be delivered to the at least one ISC on behalf of at least one service logic entity.

54. The method of claim 53 wherein the at least one AC is further operative to dynamically augment or modify an ERL through negotiation of the registration of the at least one available discrete event with the at least one ISC on behalf of at least one service logic entity.

55. A method of providing integrated control of at least one transport resource provided by at least one communication network service provider comprising:

identifying at least one Association Controller (AC) which is connectable to a plurality of communications networks so as to communicate with system entities;

dynamically receiving at the at least one AC an event registration list (ERL), which includes at least one event, through an interactive exchange of one or more commands with an integrated services controller (ISC) associated with the at least one AC; and registering one or more events from the one or more communication services which have a notification interest in said events;

wherein the at least one AC is a child member within a group, wherein all the at least one ACs within the group are related to a parent AC that manages a transport level resource group of related individual transport level resources or a group of related AC groups.

\* \* \* \* \*